US012670424B2

(12) United States Patent
Kushibe

(10) Patent No.: US 12,670,424 B2
(45) Date of Patent: Jun. 30, 2026

(54) STORAGE MEDIUM, SOLUTION SEARCH METHOD, AND INFORMATION PROCESSING DEVICE

(71) Applicant: Fujitsu Limited, Kawasaki (JP)

(72) Inventor: Daisuke Kushibe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 708 days.

(21) Appl. No.: 18/168,740

(22) Filed: Feb. 14, 2023

(65) Prior Publication Data

US 2023/0351236 A1 Nov. 2, 2023

(30) Foreign Application Priority Data

May 2, 2022 (JP) ................................. 2022-075774

(51) Int. Cl.
*G06N 10/20* (2022.01)

(52) U.S. Cl.
CPC ..................................... *G06N 10/20* (2022.01)

(58) Field of Classification Search
CPC ......... G06N 10/20; G06N 10/60; G06N 10/80
See application file for complete search history.

(56) References Cited

U.S. PATENT DOCUMENTS

| | | | |
|---|---|---|---|
| 2016/0328659 A1* | 11/2016 | Mohseni | ................. G06N 10/40 |
| 2018/0308007 A1* | 10/2018 | Amin | ..................... G06N 10/60 |
| 2018/0330264 A1 | 11/2018 | Lanting et al. | |
| 2020/0334564 A1* | 10/2020 | Mohseni | ................ G06N 10/40 |
| 2020/0393798 A1 | 12/2020 | Kushibe | |
| 2021/0286919 A1 | 9/2021 | Kushibe et al. | |
| 2022/0114470 A1 | 4/2022 | Kushibe | |

FOREIGN PATENT DOCUMENTS

| | | |
|---|---|---|
| EP | 3879463 A1 | 9/2021 |
| JP | 2019-134100 A | 8/2019 |
| JP | 2020-205049 A | 12/2020 |
| JP | 2021-106050 A | 7/2021 |
| JP | 2021-144622 A | 9/2021 |

(Continued)

OTHER PUBLICATIONS

Yuki Susa, Yu Yamashiro, Masayuki Yamamoto, Hidetoshi Nishimori, âExponential Speedup of Quantum Annealing by Inhomogeneous Driving of the Transverse Fielda, Journal of the Physical Society of Japan, 87, 023002 (2018) 10.7566/JPSJ87.023002 (Year: 2018).*

(Continued)

*Primary Examiner* — Schyler S Sanks
(74) *Attorney, Agent, or Firm* — Fujitsu Intellectual Property Center

(57) ABSTRACT
A non-transitory computer-readable storage medium storing a solution search program that causes at least one computer to execute a process, the process includes reducing, when searching for a ground state of the Ising model that represents a problem by obtaining a state change of the Ising model, a strength of a magnetic field applied to the Ising model according to a first annealing schedule from an initial state of the Ising model; and reducing, after a quantum phase transition occurs in the Ising model, the strength of the magnetic field according to a second annealing schedule.

15 Claims, 24 Drawing Sheets

(56) References Cited

FOREIGN PATENT DOCUMENTS

| | | | |
|---|---|---|---|
| JP | 2022-062760 A | 4/2022 | |
| WO | 2019/133889 A1 | 7/2019 | |

OTHER PUBLICATIONS

Kadowaki, Tadashi, and Hidetoshi Nishimori. "Quantum annealing in the transverse Ising model." Physical Review E 58.5 (1998): 5355. (Year: 1998).*

Extended European Search Report dated Jul. 10, 2023 for corresponding European Patent Application No. 23157537.4, 9 pages.

Hidetoshi Nishimori et al., "Exponential Enhancement of the Efficiency of Quantum Annealing by Non-Stoquastic Hamiltonians", Frontiers in ICT, Hypothesis and Theory, vol. 4, Article 2, pp. 1-11, Feb. 17, 2017, doi:10.3389/fict.2017.00002 (Total 11 pages).

Tameem Albash et al., "Demonstration of a Scaling Advantage for a Quantum Annealer Over Simulated Annealing", arXiv:1705.07452v3 [quant-ph], pp. 1-28, Aug. 6, 2018 (Total 28 pages).

Satoshi MORITA et al., "Mathematical Foundation of Quantum Annealing", J. Math. Phys. 49, 125210(2008), pp. 1-51, arXiv:0806.1859v1 [quant-ph], Jun. 11, 2008 (Total 51 pages).

EPOA—Office Action of European Patent Application No. 23157537.4 dated Jun. 24, 2025 [8 pages]. **EP3879463A1 cited in the EPOA was previously submitted in the IDS filed on Jul. 31, 2025.

* cited by examiner

4-CITY TSP

| city No. | x | y |
|----------|------|------|
| 1 | 0.05 | 0.43 |
| 2 | 0.44 | 0.21 |
| 3 | 0.64 | 0.25 |
| 4 | 0.96 | 0.22 |
| 5 | 0.77 | 0.41 |
| 6 | 0.8 | 0.72 |
| 7 | 0.4 | 0.6 |
| 8 | 0.42 | 0.44 |

FIG. 23

| Quantum Number | Index | | Value (Eigenvector) | E | spin (1ST TO 4TH DIGITS) | spin (5TH TO 8TH DIGITS) | spin (9TH TO 12TH DIGITS) | spin (13TH TO 16TH DIGITS) | Hamming Distance |
|---|---|---|---|---|---|---|---|---|---|
| 0 | 1057 | 0.6 | 0.7158232 | 7.4142136 | 1000 | 0100 | 0010 | 0001 | 0 |
| 0 | 292 | 0.6 | 0.6935901 | 7.4142136 | 0010 | 0100 | 1000 | 0001 | 0 |
| 0 | 33 | 0.6 | -0.0290122 | 13.0000000 | 0000 | 0100 | 0010 | 0001 | 1 |
| 0 | 288 | 0.6 | -0.0280914 | 13.0000000 | 0010 | 0100 | 0000 | 0001 | 1 |
| 0 | 1025 | 0.6 | -0.0269018 | 13.4142136 | 1000 | 0000 | 0010 | 0001 | 1 |
| 0 | 1316 | 0.6 | -0.0108598 | 21.8284271 | 1010 | 0100 | 1000 | 0001 | 3 |
| 0 | 1828 | 0.6 | 0.0001453 | 44.0644951 | 1110 | 0100 | 1000 | 0001 | 4 |
| 0 | 1617 | 0.6 | 0.0000008 | 35.9748 3686 | 1100 | 1010 | 0010 | 0001 | 4 |
| 0 | 1631 | 0.6 | 0.0000000 | 116.0879591 | 1100 | 1011 | 1110 | 0001 | 6 |

81

STORAGE MEDIUM, SOLUTION SEARCH METHOD, AND INFORMATION PROCESSING DEVICE

CROSS-REFERENCE TO RELATED APPLICATION

This application is based upon and claims the benefit of priority of the prior Japanese Patent Application No. 2022-75774, filed on May 2, 2022, the entire contents of which are incorporated herein by reference.

FIELD

The embodiments discussed herein are related to a solution search program, a solution search method, and an information processing device.

BACKGROUND

A problem that frequently occurs in natural sciences and social sciences is a minimum value solution problem (or also called a combinatorial optimization problem) that finds the minimum value of an evaluation function (or also called an energy function) (or that finds a combination of values of state variables of an evaluation function that gives the minimum value). In recent years, movement to formulate such a problem with an Ising model, which is a model representing the behaviors of spins of a magnetic material, has been accelerated.

A frequently used solution method is a method for introducing a probability process using a Markov chain Monte Carlo (MCMC) method, introducing a temperature after defining a specific distribution such as the Boltzmann distribution, and lowering the temperature as a simulation. This solution method is referred to as a simulated annealing (SA) method. However, in order to reach an exact solution with the SA method, a temperature schedule is taken as a reciprocal of a logarithm with respect to time. For example, if the temperature is lowered rapidly, a solution does not necessarily reach an optimum solution.

Under such circumstances, there has been an active movement in recent years to develop calculation techniques and computers based on the quantum mechanics. A technical basis of this movement is implementation of a quantum-annealing-type quantum computer. A theoretical basis of the quantum-annealing-type quantum computer is a quantum annealing (QA) method. The quantum computer is expected to solve a problem that is hardly solved by a frequently-used classical computer based on an electronic circuit within a realistic calculation time. At this stage, all problems cannot be solved at higher speed with the quantum computer, it is expected that some problems can be solved by the quantum computer at higher speed. A typical problem is a problem of prime factorization, which is the basis of cryptographic communication such as a Rivest-Shamir-Adleman (RSA) encryption. In this way, the quantum-annealing-type quantum computer has been implemented. Therefore, a movement to explore an application range of the quantum computer is accelerated.

In the QA, a term to which a magnetic field called a transverse magnetic field is prepared as an initial state. Note that to add an external magnetic field is referred to as sweeping. By weakening the magnetic field so as not to excite to an excited state from here, it is possible to sufficiently slowly transition to a Hamiltonian of an optimization problem to be obtained. In this way, it is possible to obtain a ground state of a quantum Ising Hamiltonian to be solved.

On the other hand, the QA has a problem in that an energy gap between the ground state and the excited state becomes smaller depending on the Hamiltonian of the system and a time for an adiabatic transition is prolonged. For example, in a process of the adiabatic transition, this is a problem in that an energy difference between a ground state and a first excited state of the intermediate Hamiltonian becomes smaller. To solve this problem, a calculation method is proposed that receives a phenomenological energy dissipation effect by solving a time-dependent Schrödinger equation in an imaginary time.

Japanese Laid-open Patent Publication No. 2021-144622, Japanese Laid-open Patent Publication No. 2022-062760, Hidetoshi Nishimori and Kabuki Takada, "Exponential Enhancement of the Efficiency of Quantum Annealing by Non-Stoquastic Hamiltonians", Frontiers in ICT, Volume 4, Article 2, February 2017, T. Albash and D. A. Lidar, "Demonstration of a scaling advantage for a quantum annealer over simulated annealing", arXiv:1705.07452v3, 6 Aug. 2018, and S. Morita, and H. Nishimori, "Mathematical foundation of quantum annealing", J. Math. Phys. 49, 125210(2008), 15 Dec. 2008 are disclosed as related art.

SUMMARY

According to an aspect of the embodiments, a non-transitory computer-readable storage medium storing a solution search program that causes at least one computer to execute a process, the process includes reducing, when searching for a ground state of the Ising model that represents a problem by obtaining a state change of the Ising model, a strength of a magnetic field applied to the Ising model according to a first annealing schedule from an initial state of the Ising model; and reducing, after a quantum phase transition occurs in the Ising model, the strength of the magnetic field according to a second annealing schedule.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is a diagram illustrating an example of an 8-city TSP;

FIG. 23 is a diagram illustrating an example of a correspondence relationship between indices of the eigenvectors and eigenstates.

DESCRIPTION OF EMBODIMENTS

There is a case where a quantum phase transition occurs in a process of quantum annealing and an Ising model to be calculated is in an excited state. After being in the excited state, the Ising model does not fall to a ground state and converges in the excited state. Therefore, even if a strength of a transverse magnetic field is slowly weakened after the occurrence of the quantum phase transition, it is not possible to obtain the ground state of the Ising model. However, typically, after the quantum phase transition has occurred, the transverse magnetic field is weakened according to an annealing schedule same as that before the occurrence, and extra processing is caused.

In one aspect, an object of this case is to reduce a calculation amount in quantum annealing.

According to one mode, it is possible to reduce a calculation amount in quantum annealing.

Here, the present embodiment will be described with reference to the drawings. Note that each of the embodiments may be implemented in combination with a plurality of embodiments as long as no contradiction arises.

First Embodiment

A first embodiment is a solution search method for reducing a calculation amount in searching for a ground state of an Ising model through quantum annealing.

Figure 1:
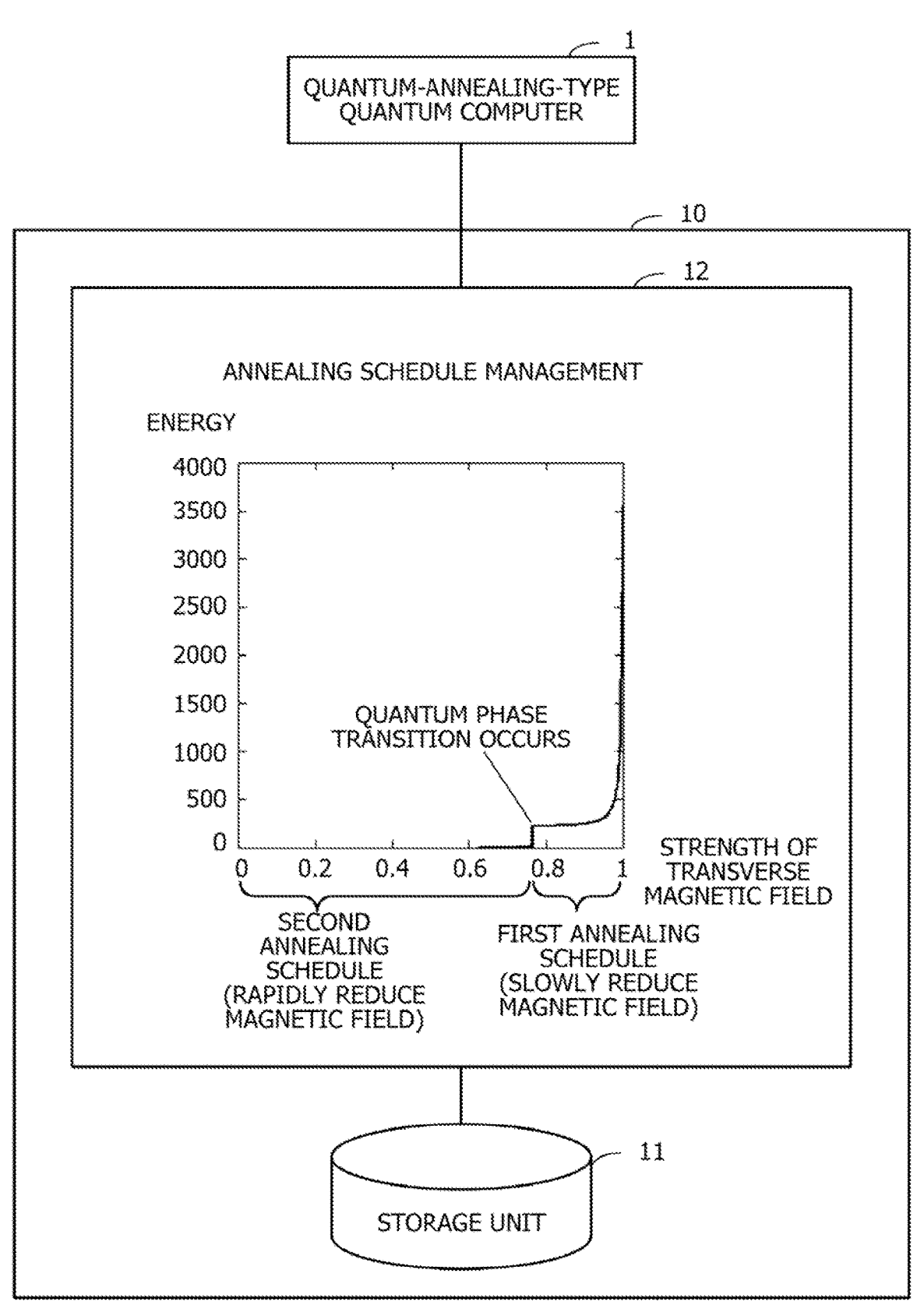
FIG. 1 is a diagram illustrating an example of a solution search method according to a first embodiment.

FIG. 1 is a diagram illustrating an example of the solution search method according to the first embodiment. FIG. 1 illustrates an information processing device 10 that performs the solution search method. The information processing device 10 can perform the solution search method, for example, by executing a solution search program.

The information processing device 10 is, for example, coupled to a quantum-annealing-type quantum computer 1. The information processing device 10 controls the quantum-annealing-type quantum computer 1 and searches for the ground state of the Ising model according to a problem to be solved using quantum annealing so as to calculate a solution of a combinatorial optimization problem, for example.

The information processing device 10 includes a storage unit 11 and a processing unit 12. The storage unit 11 is, for example, a memory or a storage device included in the information processing device 10. The processing unit 12 is, for example, a processor or an arithmetic circuit included in the information processing device 10.

The storage unit 11 stores, for example, information regarding an Ising model representing the problem to be solved. The information regarding the Ising model includes a Hamiltonian formula corresponding to the Ising model.

The processing unit 12 solves the ground state of the Ising model by obtaining a state change of the Ising model when a magnetic field applied to the Ising model representing the problem to be solved is reduced. At that time, the processing unit 12 reduces a strength of the magnetic field according to a first annealing schedule, from an initial state of the Ising model. Then, after a quantum phase transition occurs in the Ising model, the processing unit 12 reduces the strength of the magnetic field according to a second annealing schedule.

In this way, by changing the annealing schedule before and after the quantum phase transition, it is possible to apply an appropriate annealing schedule according to each of before and after the occurrence of the quantum phase transition. As a result, the calculation amount can be reduced.

For example, since changeabilities of a quantum state of the Ising model before and after the occurrence of the quantum phase transition are different, it is inappropriate to apply a common annealing schedule. For example, after the occurrence of the quantum phase transition, the quantum state of the Ising model does not transition to another state. Therefore, after the quantum phase transition has occurred, even if a magnetic field reduction speed is increased, this does not affect solution search accuracy.

Therefore, for example, in the second annealing schedule, the processing unit 12 reduces the number of updates of the magnetic field to the minimum value of the magnetic field than that in a case where the strength of the magnetic field is reduced according to the first annealing schedule after the quantum phase transition has occurred in the Ising model. As a result, after the quantum phase transition has occurred, the strength of the magnetic field is rapidly reduced, and the number of times of quantum trials performed each time when the magnetic field is updated is reduced. As a result, the calculation amount is reduced, and a solution search time is also reduced.

Furthermore, the processing unit 12 can determine a predetermined parameter value included in the Ising model so that the strength of the magnetic field applied to the Ising model when the quantum phase transition occurs is within a predetermined range. For example, the processing unit 12 solves the ground state of the Ising model for each of a plurality of solution conditions having different values of the predetermined parameters. Then, the processing unit 12 determines a value of the parameter that makes the strength of the magnetic field applied to the Ising model when the quantum phase transition occurs be within the predetermined range, based on the solution result. For example, the processing unit 12 determines the value of the parameter, based on a frequency at which a spin arrangement in a lowest energy state is obtained, for each of the plurality of solution conditions having the different values of the parameters. For example, a value of the parameter that makes the frequency at which the spin arrangement in the lowest energy state is obtained become the highest is determined as the value of the parameter that makes the strength of the magnetic field applied to the Ising model when the quantum phase transition occurs be within the predetermined range.

The processing unit 12 sets the determined parameter value to the Ising model and searches for the ground state of the Ising model. As a result, it is possible to control the strength of the magnetic field when the quantum phase transition occurs to be within an appropriate range. For example, when the strength of the magnetic field when the quantum phase transition occurs is too large, solution search accuracy decreases. Conversely, if the strength of the magnetic field when the quantum phase transition occurs is too small, a calculation time is prolonged. The strength of the magnetic field when the quantum phase transition occurs can be controlled to be within an appropriate range so that a solution can be efficiently searched according to solution search accuracy to be required.

Note that, the parameter that affects the strength of the magnetic field when the quantum phase transition occurs is, for example, a strength of spin magnetism. The strength of the spin magnetism is a parameter included in a transverse magnetic field term indicating the magnetic field to be applied to the Ising model.

Note that, if the strength of the magnetic field when the quantum phase transition occurs or a time of quantum annealing is known, by setting the value to the processing unit 12, it is possible to systematically change the annealing schedule. If the strength of the magnetic field when the quantum phase transition occurs or the time of the quantum annealing is unknown, it is possible to detect whether or not the quantum phase transition occurs, in a process of the quantum annealing.

For example, the processing unit 12 determines whether or not the quantum phase transition occurs based on a change in energy obtained in each state in a process for obtaining a state change of the Ising model when the applied magnetic field is reduced. Whether or not the quantum phase transition occurs can be determined, for example, by obtaining twice differentials of the energy according to the strength of the transverse magnetic field or the like and using a change in a sign of the twice differentials or the like.

Furthermore, the processing unit 12 can include a term indicating a nonlinear external magnetic field of a specified order in the Hamiltonian of the Ising model. By adding the nonlinear external magnetic field, it is possible to prevent a transition to an excited state. For example, the processing unit 12 changes a strength of the nonlinear transverse magnetic field according to the quantum annealing schedule. As a result, it is possible to improve a probability of obtaining the ground state.

Moreover, the processing unit 12 can execute first processing of real number time evolution that reduces the strength of the magnetic field in the solution of the ground state of the Ising model and second processing for reducing energy of the Ising model, based on the imaginary time propagation. The second processing is executed, for example, each time when the strength of the magnetic field is updated in the first processing. Thermal dissipation can be generated by using the imaginary time propagation. By introducing this thermal dissipation mechanism, it is possible to relax to the ground state without strictly observing an adiabatic transition condition.

Note that, even if the thermal dissipation according to the imaginary time propagation is generated, there is a case where the state of the Ising model transitions to the excited state. When the state is transitioned to the excited state, thereafter, it is not possible to reach the ground state even if imaginary time evolution is performed. Therefore, the processing unit 12 may perform the thermal dissipation according to the imaginary time propagation after adding the nonlinear external magnetic field to the Hamiltonian of the Ising model. As a result, it is possible to improve a probability of transitioning to the ground state.

Note that the processing unit 12 may vary a wave function of a system by searching for a solution from a plurality of initial states to which different noises are added, as an initial state of the Ising model. As a result, it is possible to reliably solve the ground state of the Ising model.

In a case where the second processing according to the imaginary time propagation is applied, the processing unit 12 may control a change amount of the external magnetic field so that an energy difference between states before and after the update of the magnetic field is equal to or less than a predetermined threshold, when the external magnetic field is updated. For example, when the strength of the magnetic field is changed through the first processing after executing the second processing according to the imaginary time propagation, the processing unit 12 calculates energy in an end state of the second processing that has been executed immediately before and an initial state of the first processing after the strength of the magnetic field is updated. Then, the processing unit 12 changes the strength of the magnetic field in a range where the energy difference between these states falls below the predetermined threshold. As a result, it is possible to prevent the state of the Ising model from transitioning to the excited state.

Second Embodiment

A second embodiment obtains a ground state (optimal value) of a system for a minimum value solution problem defined by binary N variables and a wave function of the ground state (combination of state variables at optimal value).

Figure 2:
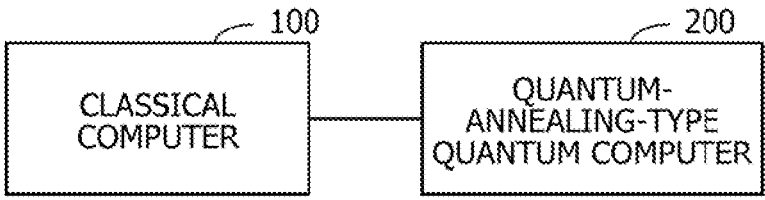
FIG. 2 is a diagram illustrating an example of a system configuration according to a second embodiment.

FIG. 2 is a diagram illustrating an example of a system configuration of the second embodiment. For example, a quantum-annealing-type quantum computer 200 is coupled to a classical computer 100. The classical computer 100 is also called a Neumann-type computer. The classical computer 100 controls the quantum-annealing-type quantum computer 200 to search for an optimal value through quantum annealing using an Ising model. The quantum-annealing-type quantum computer 200 is a device that searches for a solution for a combinatorial optimization problem through the quantum annealing.

<Hardware Configuration of Classical Computer>

Figure 3:
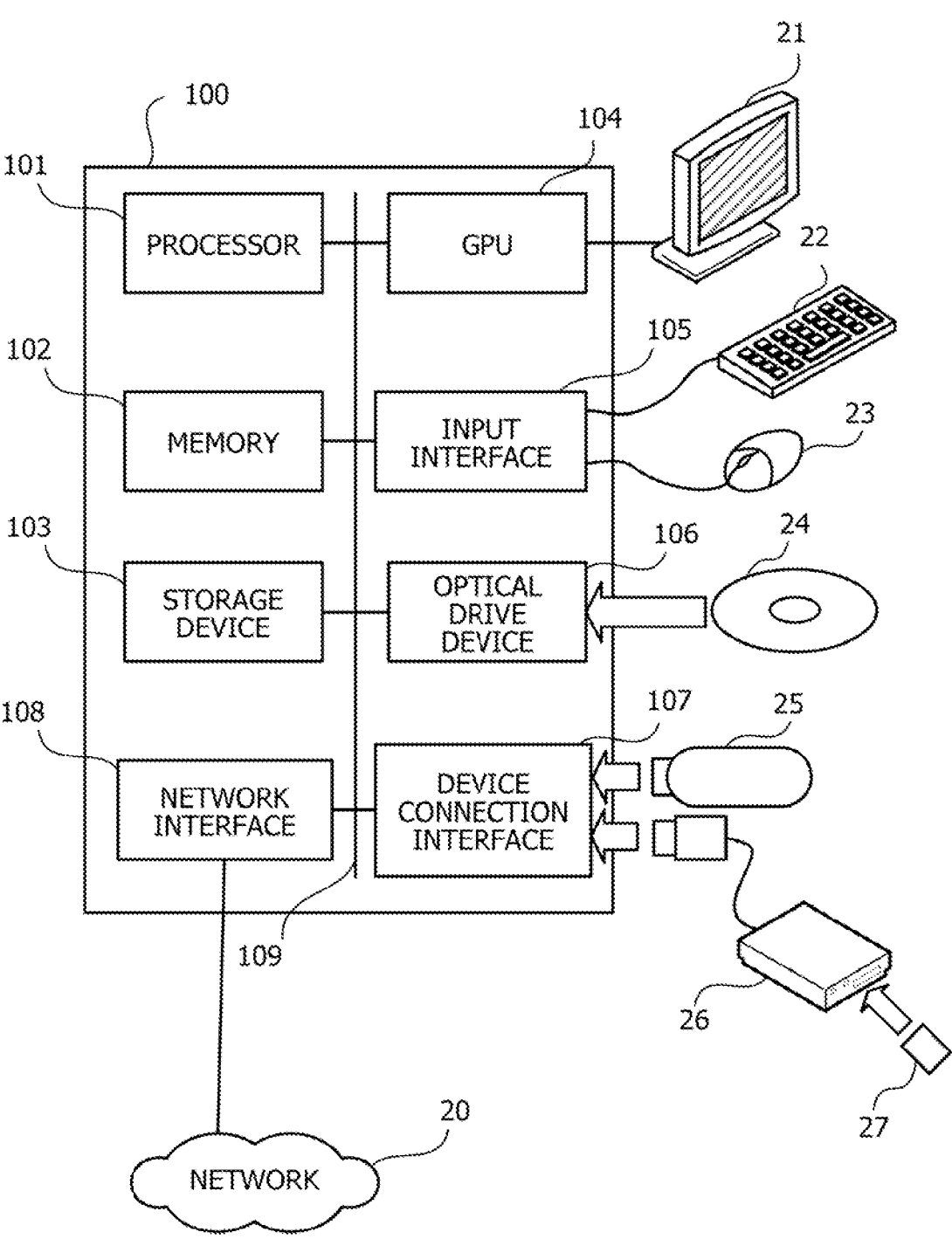
FIG. 3 is a diagram illustrating an example of hardware of a classical computer.

FIG. 3 is a diagram illustrating an example of hardware of a classical computer. In the classical computer 100, an entire device is controlled by a processor 101. A memory 102 and a plurality of peripheral devices are coupled to the processor 101 via a bus 109. The processor 101 may be a multiprocessor. The processor 101 is, for example, a central processing unit (CPU), a micro processing unit (MPU), or a digital signal processor (DSP). At least a part of functions implemented by the processor 101 executing a program may be implemented by an electronic circuit such as an application specific integrated circuit (ASIC) or a programmable logic device (PLD).

The memory 102 is used as a main storage device of the classical computer 100. The memory 103 temporarily stores at least some of operating system (OS) programs and application programs to be executed by the processor 101. Furthermore, the memory 102 stores various types of data to be used in processing by the processor 101. As the memory 102, for example, a volatile semiconductor storage device such as a random access memory (RAM) is used.

The peripheral devices coupled to the bus 109 are a storage device 103, a graphics processing unit (GPU) 104, an input interface 105, an optical drive device 106, a device connection interface 107, and a network interface 108.

The storage device 103 electrically or magnetically performs data writing and reading on a built-in recording medium. The storage device 103 is used as an auxiliary storage device of a computer. The storage device 103 stores the OS programs, the application programs, and various types of data. Note that, as the storage device 103, for example, a hard disk drive (HDD) or a solid state drive (SSD) may be used.

A monitor 21 is coupled to the GPU 104. The GPU 104 causes an image to be displayed on a screen of the monitor 21 in accordance with an instruction from the processor 101. Examples of the monitor 21 include a display device using organic electro luminescence (EL), a liquid crystal display device, or the like.

A keyboard 22 and a mouse 23 are coupled to the input interface 105. The input interface 105 transmits signals transmitted from the keyboard 22 and the mouse 23 to the processor 101. Note that the mouse 23 is an example of a pointing device, and another pointing device may also be used. Examples of the another pointing device include a touch panel, a tablet, a touch pad, a track ball, or the like.

The optical drive device 106 uses laser light or the like to read data recorded in an optical disk 24 or write data to the optical disk 24. The optical disk 24 is a portable recording medium in which data is recorded to be readable by reflection of light. Examples of the optical disk 24 include a digital versatile disc (DVD), a DVD-RAM, a compact disc read only memory (CD-ROM), a CD-recordable (R)/rewritable (RW), or the like.

The device connection interface 107 is a communication interface for connecting the peripheral devices to the classical computer 100. For example, a memory device 25 and a memory reader/writer 26 may be coupled to the device connection interface 107. The memory device 25 is a recording medium equipped with a communication function with the device connection interface 107. The memory reader/writer 26 is a device that writes data to a memory card 27 or reads data from the memory card 27. The memory card 27 is a card-type recording medium.

The network interface 108 is coupled to a network 20. The network interface 108 exchanges data with another computer or a communication device via the network 20.

The classical computer 100 can implement processing functions according to the second embodiment with the hardware described above. Note that the information processing device 10 indicated in the first embodiment can be implemented by hardware similar to that of the classical computer 100 illustrated in FIG. 3.

The classical computer 100 implements the processing functions of the second embodiment by executing, for example, a program recorded in a computer-readable recording medium. The program in which processing content to be executed by the classical computer 100 is described can be recorded in various recording media. For example, the program to be executed by the classical computer 100 may be stored in the storage device 103. The processor 101 loads at least a part of the programs in the storage device 103 into the memory 102 and executes the program. Furthermore, it is also possible to record the program to be executed by the classical computer 100 in a portable recording medium such as the optical disk 24, the memory device 25, or the memory card 27. The program stored in the portable recording medium may be executed after being installed in the storage device 103 under the control of the processor 101, for example. Furthermore, the processor 101 may read the program directly from the portable recording medium, and execute the program. Next, functions of the classical computer 100 will be described.

Figure 4:
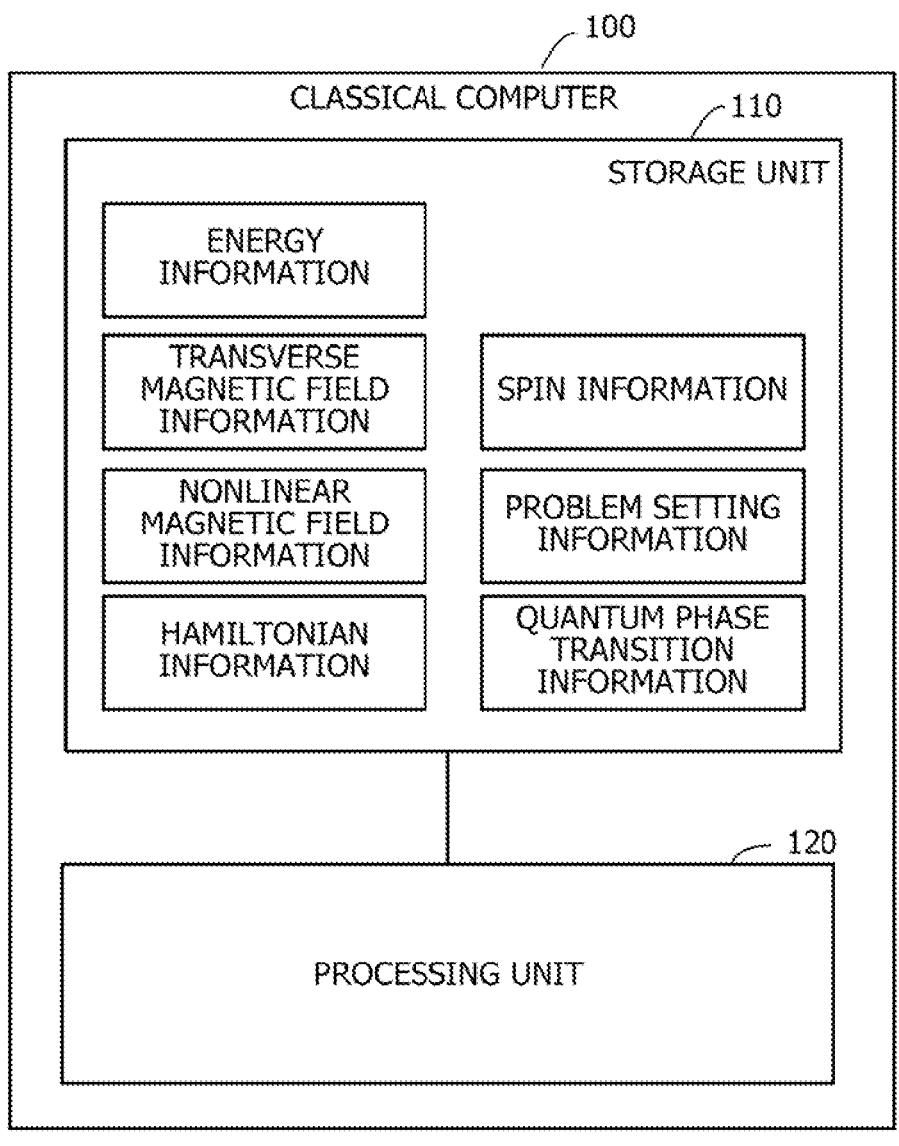
FIG. 4 is a block diagram illustrating functions included in the classical computer.

FIG. 4 is a block diagram illustrating the functions of the classical computer. The classical computer 100 includes a storage unit 110 and a processing unit 120. The storage unit 110 is implemented, for example, with a part of a storage region of the memory 102 or the storage device 103. The processing unit 120 is implemented, for example, by causing the processor 101 to execute a predetermined program.

The storage unit 110 stores energy information, spin information, transverse magnetic field information, nonlinear magnetic field information, problem setting information, Hamiltonian information, and quantum phase transition information.

The energy information includes a predetermined number of energy values in ascending order from the minimum value, among an initial value of calculated energy and energy values calculated so far. Furthermore, the energy information may include a combination of values of state variables respectively corresponding to the predetermined number of energy values. The spin information includes the value of each state variable and information for specifying a spin initialization method. The transverse magnetic field information includes information regarding a strength of a transverse magnetic field that acts on a system. The nonlinear magnetic field information includes information regarding a strength of a nonlinear transverse magnetic field that acts on the system. The problem setting information includes, for example, information indicating a problem to be solved, an optimization method to be used (SA method, quantum thermal simulated annealing (QTSA) method, or the like), various parameters used to perform the optimization method, a calculation end condition, or the like. The Hamiltonian information includes, for example, a weight coefficient ($W_{ij}$), a bias function ($b_i$), a constant (C), or the like of an energy function. The quantum phase transition information includes information regarding a quantum phase transition such as a strength of a transverse magnetic field when the quantum phase transition occurs.

The processing unit 120 executes minimum value solution processing by controlling the quantum-annealing-type quantum computer 200 based on the data in the storage unit 110. For example, the processing unit 120 reads various types of information described above from the storage unit 110 in a format that can be understood by the processing unit 120. Furthermore, the processing unit 120 generates the Hamiltonian information indicating the Hamiltonian of the Ising model used to solve the problem to be solved, based on the problem setting information. The generated Hamiltonian includes a nonlinear transverse magnetic field height. The processing unit 120 stores the generated Hamiltonian in the storage unit 110.

The processing unit 120 calculates a transverse magnetic field ($G_2$ to be described later) that is updated as a real number time evolves. For example, the processing unit 120 reduces the external magnetic field, according to a pre-defined annealing schedule. At that time, the processing unit 120 applies different annealing schedules before and after the quantum phase transition occurs. For example, the processing unit 120 receives a setting input of the strength of the transverse magnetic field when the quantum phase transition occurs and changes the annealing schedule since the specified strength of the transverse magnetic field. Furthermore, the processing unit 120 detects occurrence of the quantum phase transition in an annealing process and, when detecting the occurrence of the quantum phase transition, the processing unit 120 can apply an annealing schedule that is different from that before the detection.

Furthermore, the processing unit 120 controls evolution of an imaginary time. For example, the processing unit 120 advances the imaginary time by each time step width $\Delta\tau$ of the imaginary time each time when a spin state is calculated in a state where the transverse magnetic field is fixed. Moreover, the processing unit 120 adds noise to an initialized spin state. For example, the processing unit 120 randomly selects a predetermined number of spins from among a plurality of spins. The processing unit 120 adds noise to a probability amplitude of the selected spin. The processing unit 120 individually determines an amount of the noise for each spin, for example, using random numbers.

Note that, a line connecting the individual elements illustrated in FIG. 4 indicates a part of a communication path, and a communication path other than the illustrated communication path may also be set. Furthermore, the function of each element illustrated in FIG. 4 may be implemented by, for example, causing the computer to execute a program module corresponding to the element.

By using such a classical computer 100, it is possible to perform calculation based on the quantum mechanics as a principle for the minimum value solution problem defined by the binary N variables and obtain the wave functions in the ground state and an excited state of the system However, as described above, as one of reasons why a solution search time using the QA method is prolonged is occurrence of a phenomenon called a first-order quantum phase transition. For example, when trying to prevent the occurrence of the first-order quantum phase transition, the solution search time is prolonged. Therefore, the reason why the solution search time for the minimum value solution problem is prolonged when trying to prevent the occurrence of the first-order quantum phase transition will be described in detail.

Note that the ground state of the Ising model is a state where energy of the Hamiltonian indicating the Ising model is the lowest. Hereinafter, the ground state of the Ising model may be referred to as a ground state of the Hamiltonian. Furthermore, a magnetic field applied to the Ising model in the QA method is referred to as a transverse magnetic field.

<Summary of Ground State Calculation Method>

In a case where a classical Ising model is solved through quantum annealing, it is expected to solve the Ising model exponentially faster than solution according to the existing Markov chain Monte Carlo method. However, this does not directly mean that it can be solved in polynomial time. It is assumed that, as a result of exponentially accelerating a problem that typically needs a calculation amount of $2^N$, the calculation amount become a calculation amount of $2^{N1}$ ("1"

of "N1" is subscript) using $N_1$, which is $N_1 < N$. In this case, a calculation speed is accelerated by $2^{N-N1}$ ("1" of "N1" is subscript), and this is certainly exponential acceleration. However, even if the calculation speed is accelerated, this is not the polynomial time. However, even if it cannot be unfortunately solved in the polynomial time, the exponential acceleration is meaningful. For example, it is assumed that it be not possible to solve a certain problem even in a time since the dawn of the universe such as 13.8 billion years. In this case, it is expressed that this problem is unsolvable. However, if exponentially acceleration can be possible even in an imperfect manner and acceleration by a factor of 13.8 billion is possible, the calculation time will be one year. In this case, although this does not generally indicate that a problem having an exponential calculation amount is solved, there is a case where a speed can be sufficiently increased to solve a specific problem, and there are specific advantages of developing the technique in practical terms.

Moreover, social application of the quantum computers has been discussed, and not only production of the quantum computer itself but also application of the quantum computer to solve what kind of social problems have been increasingly discussed. For example, optimizing hospital appointments in a healthcare domain or the like may be one specific target. This is because, if schedules such as the hospital appointments can be optimized at high speed, hospitals can optimize limited human resources such as doctors, and management efficiency also increases. At the same time, a patient side also has a specific advantage such that a waiting time is reduced, and both sides have the advantages. Since both sides have benefits in this relationship, there is a specific motivation for developing techniques such as schedule optimization as an application destination of the quantum computer exists.

In a case where the ground state of the Ising model is solved by the QA method, a term to which the transverse magnetic field is added is prepared as an initial state. In a case where thermal dissipation processing is not executed, the strength of the transverse magnetic field of the Hamiltonian of the optimization problem that is defined as a binary N variable problem to be obtained is sufficiently slowly weakened from here, and the transverse magnetic field is set to be eventually zero. At this time, the wave function of the system is sufficiently slowly transitioned to the wave function of the ground state of the Ising model to be solved from the initial state, and the magnetic field is weakened so as not to excite to be the excited state. This is called an adiabatic transition. As a result of the adiabatic transition, the system eventually transitions to the ground state of the Hamiltonian to be solved. In this way, it is possible to obtain a ground state of a quantum Ising Hamiltonian to be solved.

On the other hand, the QA also has demerits. Depending on the Hamiltonian of the system, there is a problem in that an energy gap between the ground state and the excited state becomes smaller and a time for the adiabatic transition is prolonged. For example, in a process of the adiabatic transition, this is a problem in that an energy difference between a ground state and a first excited state of the intermediate Hamiltonian becomes smaller.

A case where the energy difference becomes exponentially smaller as a function of the number of spins is referred to as a first-order quantum phase transition. In a case where the quantum phase transition is the first-order, a time step width to perform time evolution as observing an adiabatic transition condition by the QA depends on the energy gap between the ground state and the excited state. Therefore, it is required to exponentially reduce the time step width. This means that the number of times of time evolution for reaching the end state by the quantum annealing method is exponentially extended.

On the other hand, there is a case where the energy difference exponentially decreases as the function of the number of spins. This is referred to as a second-order quantum phase transition. In a case where the second-order quantum phase transition occurs, a speed of the adiabatic transition of the QA exponentially decreases. In this case, a time needed to reach the end state increases in the polynomial time.

However, since many interesting problems in application involve the first-order quantum phase transition, calculation times of many practical problems exponentially increase. Therefore, a study for exploring whether or not the first-order quantum phase transition can be replaced with the second-order quantum phase transition has been conducted. There is a report indicating that a first-order phase transition can be changed to a second-order phase transition by devising the transverse magnetic field term, in a special Hamiltonian system called the Non-Stoquastic Hamiltonian ("Exponential Enhancement of the Efficiency of Quantum Annealing by Non-Stoquastic Hamiltonians"). Therefore, in the framework of the normal QA method, how to avoid the first-order quantum phase transition is a central issue in performing calculations.

Moreover, in the QA, it is required to observe the adiabatic transition condition. However, it is reported that there is a possibility that the ground state can be calculated at a finite probability although this adiabatic condition is violated, in the calculations using the quantum computer based on the QA method ("Demonstration of a scaling advantage for a quantum annealer over simulated annealing"). This is a report indicating that, in calculations using actual quantum annealing devices, there is an optimum time to solution (TTS). However, from a physical point of view, why an optimum TTS exists needs to be considered.

Considering these circumstances, in the quantum annealing, energy dissipation (thermal dissipation) occurs for some reason, and it is considered that there is a possibility that a quantum annealing mechanism functions due to the energy dissipation. A calculation method has been proposed that incorporates a phenomenological energy dissipation effect by solving the time-dependent Schrödinger equation in the imaginary time (Japanese Laid-open Patent Publication No. 2021-144622).

However, there may be a case where the ground state cannot be calculated even if the calculation method that incorporates the energy dissipation effects is used. This is because, when the spin is reversed once and the quantum state falls into a corresponding classical state, thereafter, the spin is not reversed even no matter how much the transverse magnetic field is weakened. For example, in the traveling salesman problem or the like, if a state (excited state) other than the optimum solution is obtained by the imaginary time evolution, there is no mechanism for deexciting the excited state to the ground state.

This problem will be briefly described. First, a quantum annealing Hamiltonian is usually defined by the following formula (1.1). Note that it is assumed that the number of spins be N (N is natural number).

[Expression 1]

$$\hat{H}_{QA}(G_1, G_2) = G_1 \hat{H}_{TH} + G_2 \hat{T} \tag{1.1}$$

$G_1$ and $G_2$ are constants. In the quantum annealing, it is often assumed $G_1 = 1 - G_2$. In a case of $G_1 = 1 - G_2$, although it is assumed $0 \le G_1 \le 1$ and $0 \le G_2 \le 1$, they may be typically arbitrary. Even in a case where the condition of $G_1 = 1 - G_2$ is not applied, $G_1 = 1$ when $G_2 = 0$ is applied as a boundary condition. $H_{TH}$ is a Hamiltonian for solving the minimum value. T(with ^) is a transverse magnetic field operator. In the classical Ising model, H ({z}) is defined by the formula (1.2) for a binary variable $z_1 = \{0, 1\}$.

[Expression 2]

$$H(\{z\}) = \sum_{j>i}^{N} W_{ij} z_i z_j + \sum_{i=1}^{N} b_i z_i + C \tag{1.2}$$

This formula (1.2) is the Hamiltonian to be solved. Here, $W_{ij}$, $b_i$, and C are real numbers, and respectively referred to as a weight coefficient, a bias function, and a constant term. The formula (1.2) cannot be used in the quantum mechanics as it is. Therefore, in the formula (1.2), the Hamiltonian $H_{TH}$ (H is with ^) in the formula (1.3) obtained by replacing the binary variable $z_i$ as $z_i \rightarrow \sigma_i^z$ ($\sigma$ is with ^) and quantizing the binary variable $z_i$ is introduced.

[Expression 3]

$$\hat{H}_{TH} = \sum_{j>i}^{N} W_{ij} \hat{\sigma}_i^z \hat{\sigma}_j^z + \sum_{i=1}^{N} b_i \hat{\sigma}_i^z + C \tag{1.3}$$

However, as it is, there is no term where a spin motion is described. Since no motion energy term is included in a normal Schrödinger equation, a term T (with ^), in which the spin motion is described, that is referred to as a transverse magnetic field term is introduced in a form of the formula (1.4).

[Expression 4]

$$\hat{T} = \sum_{i=1}^{N} J_i \hat{\sigma}_i^x \tag{1.4}$$

For example, this is a strategy, in order to obtain the minimum value of the formula (1.2), for achieving the solution of the minimum value of the formula (1.2) of the classical Ising model by extending the Hamiltonian to the formula (1.1) of the quantum Hamiltonian and obtaining the lowest energy state of the formula (1.1). The reason why such a strategy is adopted is because it can be considered that the lowest energy state can be quickly obtained by extending it to the quantum theory.

A non-relativistic Schrödinger equation for the Hamiltonian in the (1.1) formula is the formula (1.5).

[Expression 5]

$$\hat{H}_{QA}(G_1, G_2) |\Psi(t)\rangle = i\hbar \frac{\partial}{\partial t} |\Psi(t)\rangle \tag{1.5}$$

In a theoretical framework of the quantum annealing, a state that can be experimentally created as an initial state is set as an initial state. For example, the formula (1.6) is obtained.

[Expression 6]

$$|\Psi(t = 0)\rangle = |\varphi_1(t = 0)\rangle \otimes |\varphi_2(t = 0)\rangle \otimes \cdots \otimes |\varphi_N(t = 0)\rangle \quad (1.6)$$

Here, $|\varphi_i$ (t=0)> is defined for i=1, 2, . . . , and N and is a wave function for one spin. In the quantum annealing, the formula (1.7) is assumed as the initial state.

[Expression 7]

$$|\varphi_i(t = 0)\rangle = \frac{1}{\sqrt{2}}(|0\rangle - |1\rangle) \quad (1.7)$$

This is because the formula (1.7) is the ground state of the transverse magnetic field operator T (with ^) when $J_i$>0. Processing for time-evolving the wave function of the system according to the formula (1.5) from the initial state of the formula (1.7) is executed. For example, $G_2$ (t=0)=1 and $G_1$ (t=0)=0 are set. $G_2$ is sufficiently slowly decreased so as not to excite the state to the excited state and so that $G_2$ (t>>1)=0 is satisfied. At this time, since $G_1$ (t>>1)=1 is satisfied, if the transition to the excited state is not performed, the ground state of the Hamiltonian $H_{TH}$ (H is with ^) to be solved is finally obtained. At this time, a condition not to transition to the excited state is referred to as an adiabatic transition condition.

Note that operators are defined as follows.

[Expression 8]

$$\hat{\sigma}_i^z = \begin{pmatrix} 1 & 0 \\ 0 & 0 \end{pmatrix} \quad (1.8)$$

[Expression 9]

$$\hat{\sigma}_i^x = \begin{pmatrix} 0 & 1 \\ 1 & 0 \end{pmatrix} \quad (1.9)$$

[Expression 10]

$$|1\rangle = |\alpha_i\rangle = \begin{pmatrix} 1 \\ 0 \end{pmatrix} \quad (1.10)$$

[Expression 11]

$$|0\rangle = |\beta_i\rangle = \begin{pmatrix} 0 \\ 1 \end{pmatrix} \quad (1.11)$$

Although the formula (1.8) is different from a definition of a spin operator that is usually used, this is because an eigenvalue of the spin operator is set to be 1 and 0, not to be 1 and −1. For $|\alpha_i\rangle$ and $|\beta_i\rangle$, the formula (1.12) is satisfied as an orthogonal relationship. Here, $\delta_{ij}$ is the Kronecker delta.

[Expression 12]

$$\langle \alpha_i | \beta_i \rangle = \langle \alpha_i | \beta_i \rangle = \delta_{\alpha_i \beta_i} \quad (1.12)$$

Next, an eigen equation for a vertical magnetic field term $\sigma_i^z$ is indicated below.

[Expression 13]

$$\hat{\sigma}_i^z | \alpha_i \rangle = 1 | \alpha_i \rangle \quad (1.13)$$

[Expression 14]

$$\hat{\sigma}_i^z | \beta_i \rangle = 0 | \beta_i \rangle \quad (1.14)$$

The transverse magnetic field term $\sigma_i^x$ ($\sigma$ is with ^) is as follows.

[Expression 15]

$$\hat{\sigma}_i^x | \alpha_i \rangle = | \beta_i \rangle \quad (1.15)$$

[Expression 16]

$$\hat{\sigma}_i^x | \beta_i \rangle = | \alpha_i \rangle \quad (1.16)$$

It should be noted that a definition of $\sigma_i^z$ ($\sigma$ is with ^) is the formula (1.9) and is slightly different from the Pauli spin matrices that are usually used.

The QTSA method introduced in Japanese Laid-open Patent Publication No. 2021-144622 described above is a method for solving the equation by changing a time from a real number to an imaginary in a case where the Schrödinger equation in the formula (1.5) is numerically solved. A wave function at a time t is typically given as (1.17).

[Expression 17]

$$|\Psi(t)\rangle = \sum_{n=0}^{\infty} d_n(t) \exp\left(-i\frac{E_n}{\hbar}t\right)|\psi_n\rangle \quad (1.17)$$

Here, it is assumed that $|\psi_n\rangle$ be an eigenstate of $H_{TH}$ (H is with ^). For example, the eigenstate is (1.18).

[Expression 18]

$$\hat{H}_{TH} |\psi_n\rangle = E_n |\psi_n\rangle \quad (1.18)$$

In the QTSA method, the time t is converted into an imaginary using the formula (1.19).

[Expression 19]

$$t = -i\tau \quad (1.19)$$

Although $\tau$ is a real number, $\tau$ is referred to as an imaginary time. When the formula (1.17) is deformed using the formula (1.19), the following formula (1.20) is obtained.

[Expression 20]

$$|\Psi(\tau)\rangle = \exp\left(-\frac{E_0}{\hbar}\tau\right)\sum_{n=0}^{\infty} d_n(\tau) \exp\left(-\frac{(E_n - E_0)}{\hbar}\tau\right)|\psi_n\rangle \quad (1.20)$$

When the limit of the imaginary time $\tau \to \infty$ is taken in the formula (1.20), an amplitude of only the ground state remains, resulting in the formula (1.21)).

15

16

[Expression 21]

$$|\Psi(\tau)\rangle \cong d_0(\tau)\exp\left(-\frac{E_0}{\hbar}\tau\right)|\psi_0\rangle \tag{1.21}$$

Here, although the formula (1.21) also finally becomes zero, this is because a unitary conservation is violated by setting the time as the imaginary. However, when calculation is performed while performing renormalization to observe a normalization condition of the wave function so as to force to perform unitarily conservation in the formula (1.20), only information regarding the excited state disappears, and only information regarding the ground state finally remains. This is an outline of the imaginary time propagation. A specific procedure is as described in Japanese Laid-open Patent Publication No. 2021-144622.

However, in complete system evolution which is the premise of the imaginary time evolution, it is assumed that "the ground state is included" in the formula (1.17). If the information regarding the ground state is lost during the imaginary time evolution, the state is converged to the excited state. Therefore, when the state is converged to the excited state once, even if the imaginary time evolution continues, the state does not fall into the ground state. This is because the information regarding the ground state that is the premise of the imaginary time evolution disappears.

Figure 5:
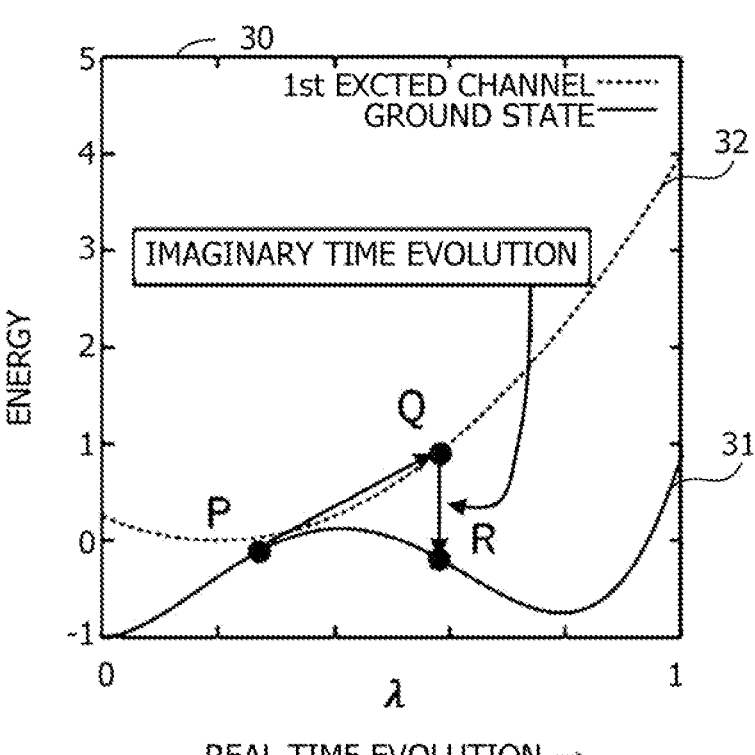
FIG. 5 is a schematic diagram of thermal dissipation using an imaginary time propagation.

FIG. 5 is a schematic diagram of the thermal dissipation using the imaginary time propagation. In FIG. 5, a graph 30 is illustrated in which the horizontal axis indicates λ and the vertical axis indicates energy of a system obtained by the Hamiltonian. In the example in FIG. 5, energy in the ground state according to λ when a constant λ corresponding to the strength of the transverse magnetic field transitions from zero to one according to the real number time evolution is indicated by a solid line 31. Furthermore, a first excited energy state according to λ is indicated by a dotted line 32. The strength of the transverse magnetic field is maximum when λ is zero, and the strength of the transverse magnetic field is minimum when λ is one.

Here, it is assumed that λ in FIG. 5 be $1-G_2$. It is assumed that the imaginary time evolution be performed on the given λ and a ground state at the given λ be obtained. Then, it is assumed that the value of λ be slightly increased to $λ+\Delta λ$. At this time, as an initial value of the wave function at $λ+\Delta λ$, a wave function obtained as a result of the imaginary time evolution at a value of λ in the previous stage is used. By repeating this procedure, a wave function at λ=1 can be finally obtained.

However, in a situation where the first-order quantum phase transition occurs, as in the vicinity of a point P in FIG. 5, a plurality of quantum states is energetically close to each other. Therefore, the state transitions to the excited state if Δλ is not sufficiently small. For example, a transition from a point Q to a point R as a result of the imaginary time evolution is originally expected, if the transition to the point Q is achieved once, this is the excited state. Therefore, the information regarding the ground state is lost at the time of the transition. As a result, even if the imaginary time evolution is continued, the transition to the point R is not achieved. Then, even if the imaginary time evolution is continued to λ=1, the state no longer reaches the ground state.

In fact, if the number of qubits is increased, the quantum states that are energetically close to each other largely increase. Then, an energy difference becomes significantly small. Therefore, only by adding a small amount of noise to the system, a state of λ=1 that is finally obtained changes. At this time, a spin arrangement is obtained in a considerably different state. It is known that the energy difference exponentially decreases as in the formula (1.22) depending on the problem. However, the end state obtained as a result largely changes due to a slight energy difference in an intermediate state.

[Expression 22]

$$\Delta E_1 = O(\exp(-\alpha N)) \tag{1.22}$$

Since calculations and experiments are always conducted with finite precision, it is not possible to distinguish between the ground state and the excited state according to the measurement with the finite precision. For example, although a double precision real number is often used in simulations, only 16 digits of the double precision real number can be used. If the ground state and the excited state are almost degenerated and the energy difference appears in and after a 17th digit, it is no longer possible to distinguish between the ground state and the excited state through the calculation with 16-digit precision. A numerically degenerated state occurs.

As a result, if it is regarded as a numerically degenerated state, which state the transition is performed to is completely randomly determined. A transition destination is determined by a slight error that appears at the time of the time evolution of the wave function. Then, the problem is that it is no longer possible to control the transition destination.

This may be considered that spontaneous symmetry is broken. There is a plurality of energy level structures that is substantially degenerated, and transition to any energy level can be achieved at an equal probability at the time of the quantum annealing. Depending on a slight difference in the initial state such as errors accumulated at the time of calculations or noise from outside, a finally-arrived macroscopic quantum state changes. An incidental cause determines the fate of the system.

Then, will this be solved by using 32-digit or 64-digit multiple precision? If the formula (1.22) is correct, for example, if the energy difference between the ground state and the excited state is exponentially decreased as a function of the number of spins N, the number of digits needed to distinguish the energy difference increases in proportion to the number of spins N when the number of spins is increased. Therefore, in a case of N>>1, the number of digits $N_d$ used to describe the energy difference is $N_d \propto N$, and even if a multiple-precision calculation of 32 digits or 64 digits is used, a problem same as that at the time of double-precision calculation occurs.

In addition, there is one more large problem. That is a calculation time problem. The calculation time at the time of quantum annealing (the number of calculations of imaginary time evolution) $N_I$ is given by the formula (1.23) as a function of the number of calculations $n_I(G_2)$ needed for the imaginary time evolution with a given value of $G_2$.

[Expression 23]

$$N_I = \int_1^0 n_I(G_2)dG_2 \geq n_I(G_{20}) \tag{1.23}$$

Here, $G_{20}$ is a value of $G_2$ for causing the first-order quantum phase transition. Since a first excited state is given as a sufficiently small time according to the formula (1.20), estimation of the calculation time in the imaginary time evolution is given by the formula (1.24).

[Expression 24]

$$\exp\left(-\frac{(E_1 - E_0)}{\hbar}\tau\right) \ll 1 \qquad (1.24)$$

Therefore, a calculation time $\tau_1$ can be estimated according to the formula (1.25).

[Expression 25]

$$\tau_1 = \frac{\hbar}{\Delta E_1} \qquad (1.25)$$

$\Delta E_1$ is as indicated in the formula (1.26).

[Expression 26]

$$\Delta E_1 = E_1(G_1, G_2) - E_0(G_1, G_2) \qquad (1.26)$$

Here, if the first-order quantum phase transition occurs, $\Delta E_1$ is given by the formula (1.22). Therefore, a calculation time as indicated in the formula (1.27) is needed.

[Expression 27]

$$\tau_1 \cong O(\exp(\alpha N)) \qquad (1.27)$$

Therefore, the total calculation time $N_I$ is expressed by the formula (1.28).

[Expression 28]

$$N_I \geq n_I(G_{20}) \propto O(\exp(\alpha N)) \qquad (1.28)$$

As a result, when the first-order quantum phase transition occurs, the calculation time is exponentially prolonged as a function of the number of spins N. Moreover, the formula (1.25) is called an uncertainty principle of energy and a time. Therefore, the formula (1.25) is not a problem of computational technique and is a fundamental problem as the physics.

The root of this problem comes from that the energy difference exponentially decreases as in the formula (1.22), and the essence of the problem is that the energy level is substantially degenerated. In this case, since the energy level is substantially degenerated, it is difficult for a user to control a final state of calculation. This problem occurs in a case where the ground state is obtained through a single time of quantum annealing calculation.

Even in such a situation, if it is sufficient to stochastically obtain the ground state, it is possible to obtain the ground state in a short time.

Therefore, concept of a quantum trial is introduced. Here, the concept of the quantum trial will be briefly described using a case where the traveling salesman problem (TSP) of four cities is actually solved through the imaginary time evolution as an example.

Figure 6:
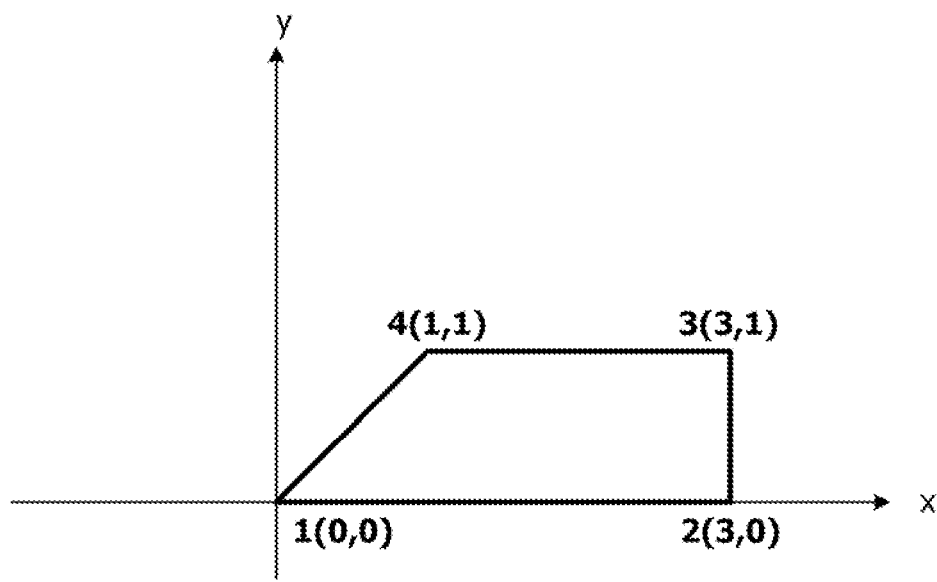
FIG. 6 is a diagram illustrating a city arrangement example in a 4-city TSP.

FIG. 6 is a diagram illustrating a city arrangement example in a 4-city TSP. In the example in FIG. 6, a position of the first city is (0, 0), a position of the second city is (3, 0), a position of the third city is (3, 1), and a position of the fourth city is (1, 1). It is known that there are only three paths in this problem and the three paths are 7.414, 7.812, and 10.398 from the minimum path in order.

As an initial state, a small amount of the noise $\delta_i$ is added to the amplitude of the wave function as in the formula (1.29). However, if the noise is added, a norm of the wave function changes from one. Therefore, after the noise is added, renormalization is performed so that the norm of the wave function becomes one.

[Expression 29]

$$|\varphi_i(t = 0)\rangle = \left(\frac{1 + \delta_i}{\sqrt{2}}\right)|0\rangle - \frac{1}{\sqrt{2}}|1\rangle \qquad (1.29)$$

A random value is set to the noise in the formula (1.29). However, convergence determination at the time of imaginary time evolution is set to be smaller than the number of digits used for calculation. For example, in a case where a double-precision floating point is used, it is assumed that energy convergence determination be $\Delta E \leq 10^{-10}$ or the like. In this case, an effect of noise given at an initial stage remains. In this way, noise is slightly and randomly given to the system, and quantum annealing calculation is performed. One quantum state is finally obtained as a calculation result. This series of operations is referred to as a quantum trial.

Figure 7:
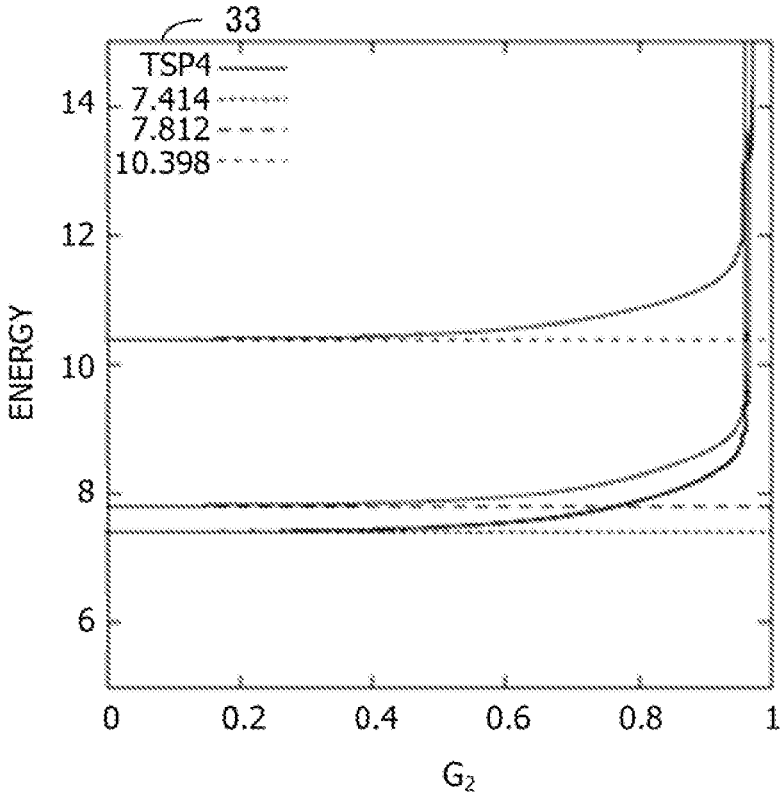
FIG. 7 is a diagram illustrating a difference in calculation results according to noise randomly added to an initial state.

A result obtained by performing the quantum trial 200 times is illustrated in FIG. 7. Here, $G_2$ is given as a discrete point, and a division point is defined at regular intervals. Then, the number of division points used for calculation is 1024.

FIG. 7 is a diagram illustrating a difference in the calculation results according to the noise randomly added to an initial state. In a graph 33 illustrated in FIG. 7, the horizontal axis indicates $G_2$, and the vertical axis indicates total energy. Each of three solid lines illustrated in the graph 33 indicates an energy value for each value of $G_2$ through quantum trials having different numbers of division points. As illustrated in the graph 33, there is a case where a ground state of which the result is 7.414 is obtained or a case where the excited state of which the result is 7.812 or 10.398 is obtained, depending on the number of division points.

As illustrated in FIG. 7, although an energy state, which is finally obtained, differs due to slight noise given as the initial state, the ground state is reached with a finite probability. This can be considered as reconsidering the problem as a kind of a scattering process and solving the problem.

However, there are problems in a case where the quantum trial is used. Through the calculations using the quantum trial, the annealing schedule for the quantum annealing can be greatly relaxed, and the ground state can be calculated with a finite probability through the quantum trial. However, as the number of spins N increases, the probability of obtaining the ground state is lowered, and it is difficult to reach the ground state.

From such a background, it is desired to develop a technology for increasing the probability of reaching the ground state when the quantum trial is performed.

Therefore, the technology for increasing the probability of reaching the ground state in a case where the quantum trial is used is applied to the classical computer 100.

<Outline of Technology for Increasing Probability of Reaching Ground State>

The classical computer 100 obtains an optimum solution of the Ising model defined by the binary N variables by the variation principle based on the quantum mechanics. Then, in a case of performing calculation with the QTSA method by applying the proposed technology, the classical computer 100 does not necessarily obtain the ground state, does not reach the ground state in some cases, solve a problem of reaching the excited state, and tries to reach the ground state with high probability.

The processing executed by the classical computer 100 to increase the probability of reaching the ground state is, for example, the following processing.

1. The classical computer 100 solves the quantum annealing Hamiltonian in a framework of the quantum mechanics. For example, the classical computer 100 receives effects of thermal dissipation and extends a time in a quantum mechanical time evolution operator to complex numbers. Then, the classical computer 100 realizes the thermal dissipation based on the imaginary time propagation. By introducing the thermal dissipation mechanism, it is possible to relax to the ground state without strictly observing the adiabatic transition condition.

2. The classical computer 100 reconsiders the QTSA method as the scattering process in the imaginary time and gives diversity to the initial state. This creates a pair of the initial state and the end state. This is defined as the quantum trial, the classical computer 100 obtains the excited state including the ground state of the target Hamiltonian through multiple times of quantum trials of which the initial states are changed.

3. In order to give the diversity to the initial value of the wave function, the classical computer 100 actively uses noise that is usually treated as a disturber and gives the diversity to the wave function of the system with the noise. As a result, the symmetry of the system is destroyed, and a fatal increase in the calculation amount in the quantum annealing calculation is suppressed.

4. Since the probability of reaching the ground state is lowered when the number of spins N increases, the classical computer 100 introduces a nonlinear external magnetic field. This can induce multi-spin excitation and reduce the number of quantum states where energy is substantially degenerated. Therefore, the number of end state candidates is reduced. As a result, a transition probability to the ground state can be increased.

Hereinafter, processing executed by the classical computer 100 will be described in detail.

<Regarding Hamiltonian of Ising Model Problem>

First, an Ising-type problem that is a minimum value solution problem will be described. The Ising-type problem is a model that has been originally used in the study of magnetic bodies in the physics domain, and the total energy when there are N spins is described as in the formula (1.2).

The Ising-type problem obtains the minimum value of the Hamiltonian given in the formula (1.2). However, it is known that a calculation amount for obtaining the minimum value is typically about $2^N$ times. For example, the calculation time for obtaining the optimum solution cannot be suppressed in the polynomial time and exponentially increases. Therefore, the formula (1.2) is not usually solved in a brute-force manner, calculations based on the Metropolis method is often performed to obtain the minimum value.

Although the SA method, the replica exchange method, or the like is often used, a calculation amount used before reaching the minimum value is not strictly obtained in the calculation method based on the Metropolis method. Then, it is empirically known that the calculation amount of the calculation method based on the Metropolis method exponentially increases with respect to the number of spins N.

In order to make the classical Hamiltonian to be faster than calculation based on a probability process, a framework is considered that performs calculation using the quantum theory. However, the formula (1.1) of the Hamiltonian is slightly changed, and a quantum mechanical Hamiltonian defined by the formula (2.1) is used.

[Expression 30]

$$\hat{H}_{QA}(G_1, G_2) = G_1 \hat{H}_{TH} + G_2 \hat{T} + G_3 \hat{V}_{add} \qquad (2.1)$$

A difference between the formula (2.1) and the formula (1.1) is that an additional external magnetic field term is added, in addition to the transverse magnetic field. Here, a nonlinear external magnetic field is assumed as $V_{add}$ (V is with ^). The formula (2.2) is considered as a specific example.

[Expression 31]

$$\hat{V}_{add} = \hat{T}^2 = \left( \sum_{i=1}^{N} J_i \hat{\sigma}_i^x \right)^2 \qquad (2.2)$$

Here, it is assumed that $G_3$ satisfy the following boundary conditions (2.3) and (2.4).

[Expression 32]

$$\lim_{G_2 \to 0} G_3 = 0 \qquad (2.3)$$

[Expression 33]

$$\lim_{G_2 \to 1} G_3 = 0 \qquad (2.4)$$

As long as these conditions are satisfied, various $G_3$ can be considered. For example, one example is the formula (2.5) as assuming n>0.

[Expression 34]

$$G_3 = kG_2(1 - G_2^n) \qquad (2.5)$$

This condition is set so that the equation has a trivial solution when $G_2 \to 1$. The condition when $G_2 \to 0$ is set so that the Hamiltonian matches a potential to be obtained when $G_2 \to 0$. Note that, for $G_1$, a type that is often used in the quantum annealing can be used and is expressed by the formula (2.6).

[Expression 35]

$$G_1 = 1 - G_2 \qquad (2.6)$$

It is assumed that definitions of $H_{TH}$ (H is with ˆ) and T (with ˆ) be respectively the formulas (1.3) and (1.4). It is assumed that definitions of operators be the formulas (1.8) and (1.9). It is assumed that definitions and operations of a bra-vector and a ket-vector be the formulas (1.10) to (1.16). It is assumed that the non-relativistic Schrödinger equation be (1.5). The wave function is assumed to be the formula (1.16) as a direct product type of a wave function of one spin.

Next, ket-display of a one-particle wave function representing an i-th qubit is defined by the formula (2.7).

[Expression 36]

$$|\varphi_i(t)\rangle = C_{i\alpha}(t)\,|\alpha_i\rangle + C_{i\beta}(t)\,|\beta_i\rangle \tag{2.7}$$

$C_{i\alpha}(t)$ is a complex number representing a probability amplitude and a phase of a $|\alpha_i\rangle$ state of an i-th spin. $C_{i\beta}(t)$ is a complex number representing a probability amplitude and a phase of a $|\beta_i\rangle$ state of the i-th spin. Bra-display of the one-particle wave function is defined by the following formula (2.8).

[Expression 37]

$$\langle\varphi_i(t)| = C_{i\alpha}^*(t)\langle\alpha_i| + C_{i\beta}^*(t)\langle\beta_i| \tag{2.8}$$

Here, as assuming that the one-particle wave function be normalized, the formula (2.9) is satisfied.

[Expression 38]

$$\langle\varphi_i(t)\,|\,\varphi_i(t)\rangle = |C_{i\alpha}|^2 + |C_{i\beta}|^2 = 1 \tag{2.9}$$

Next, physical amounts frequently used are defined as follows.

[Expression 39]

$$x_i = \langle\varphi_i(t)\,|\,\hat{\sigma}_i^z|\varphi_i(t)\rangle = |C_{i\alpha}|^2 \tag{2.10}$$

[Expression 40]

$$y_i = \langle\varphi_i(t)\,|\,\hat{\sigma}_i^x|\varphi_i(t)\rangle = C_{i\alpha}^*(t)C_{i\beta}(t) + C_{i\beta}^*(t)C_{i\alpha}(t) \tag{2.11}$$

A wave function of an N particle system is defined as follows.

[Expression 41]

$$|\Psi(t)\rangle = \prod_{i=1}^{N}|\varphi_i(t)\rangle \tag{2.12}$$

Note that, when it is assumed that a probability that an m-th spin is observed as an α spin be $P_{m,\alpha}$ and a probability that the m-the spin is observed as a β spin be $P_{m,\beta}$, these are respectively represented by the following formulas.

[Expression 42]

$$P_{m,\alpha} = |C_{m\alpha}|^2 \tag{2.13}$$

[Expression 43]

$$P_{m,\beta} = |C_{m\beta}|^2 \tag{2.14}$$

The Hamiltonian of the Ising model problem has been described above.

<Basic Equations According to Imaginary Time Propagation>

Next, basic equations according to the imaginary time propagation will be described.

Now it is considered to solve the time-dependent Schrödinger equation (1.5) defined by the Hamiltonian formula (2.1).

Next, a governing equation in a case where the imaginary time propagation (ITP) is applied to a quantum Ising system is derived. A first-order ITP is used as a time evolution operator. The first-order ITP operator is given by the formula (2.15).

[Expression 44]

$$\tilde{U}(t_0,\,t_0+\Delta t) = \exp\{-(\hat{V}+\hat{T})\Delta\tau\} \cong \exp\{-\hat{T}\Delta\tau\}\exp\{-\hat{V}\Delta\tau\} + 0(\Delta\tau^2) \tag{2.15}$$

When $\Delta t$ of the formula (2.15) is expanded and rearranged to the first-order term, the formula (2.16) is obtained.

[Expression 45]

$$\hat{U}(\tau,\,\tau+\Delta t) \cong 1 - \hat{H}(\lambda,\,\tau)\Delta\tau + O(\Delta\tau^2) \tag{2.16}$$

Next, an equation in which time evolution of a wave function is described is derived. The time evolution of the wave function is given by the formula (2.17).

[Expression 46]

$$|\Psi(\tau+\Delta t)\rangle = \tilde{U}(\tau,\,\tau+\Delta t)|\Psi(t)\rangle \tag{2.17}$$

Here, if a wave function of an N−1 spin system excluding a wave function of an m-th particle is written as $|\psi_{\bar{m}}(\tau)\rangle$ (m is overlined), this wave function is as in the following formula (2.18).

[Expression 47]

$$|\Psi_{\bar{m}}(\tau)\rangle = \prod_{i=1,i\neq m}^{N}|\varphi_i(\tau)\rangle \tag{2.18}$$

On both sides of the formula (2.18), $\langle\alpha_m|\times\langle\psi_{\bar{m}}(\tau_0)$ (x is tensor product (x in circle), subscript m of ψ is overlined) acts. As a result, the left side is the formula (2.19) and the formula (2.20).

[Expression 48]

$$\langle\alpha_m|\otimes\langle\Psi_{\bar{m}}(\tau)\,|\,\Psi(\tau+\Delta\tau)\rangle = C_{m\alpha}(\tau+\Delta\tau)\prod_{i=1,i\neq m}^{N}\{1+M_i^*\Delta\tau\} \tag{2.19}$$

-continued

[Expression 49]

$$\langle \beta_m \mid \bigotimes \langle \Psi_{\overline{m}}(\tau) | \Psi(\tau + \Delta\tau)\rangle = C_{m\beta}(\tau + \Delta\tau) \prod_{i=1, i\neq m}^{N} \{1 + M_i^* \Delta\tau\} \tag{2.20}$$

Here, $M_i^*$ is an amount representing difficulty of changing the spin and is represented by the formula (2.21).

[Expression 50]

$$M_i^* = C_{i\alpha}^*(\tau) \frac{dC_{i\alpha}(\tau)}{d\tau} + C_{i\beta}^*(\tau_0) \frac{dC_{i\beta}(\tau)}{d\tau} \tag{2.21}$$

Here, the formula (2.22) is defined.

[Expression 51]

$$\Omega_m(\tau) = \prod_{i=1, i\neq m}^{N} \{1 + M_i^* \Delta\tau\} \tag{2.22}$$

When $\Omega_m(\tau)$ is rearranged to a term of $\Delta\tau$, the formula (2.23) is obtained.

[Expression 52]

$$\Omega_m(\tau) \cong 1 + \Delta\tau \sum_{i=1, i\neq m}^{N} M_i^* \tag{2.23}$$

Next, when a right side that is a result of causing $\langle \alpha_m | x \langle \psi_m(\tau_0)$ (x is tensor product (x in circle), subscript m of $\psi$ is overlined) and $\langle \beta_m | x \langle \psi_m(\tau_0)$ (x is tensor product (x in circle), subscript m of $\psi$ is overlined) to act on both sides of the formula (2.18) is obtained and a governing equation according to the m-th (m=1, 2, . . . , N) spin is obtained, the formula (2.24) is obtained.

[Expression 53]

$$\begin{pmatrix} C_{m\alpha}(\tau + \Delta\tau)\Omega_m(\tau) \\ C_{m\beta}(\tau + \Delta\tau)\Omega_m(\tau) \end{pmatrix} = \begin{pmatrix} C_{m\alpha}(\tau) \\ C_{m\beta}(\tau) \end{pmatrix} - \Delta\tau \begin{pmatrix} H_{1,m,\alpha\alpha} & H_{1,m,\alpha\beta} \\ H_{1,m,\alpha\beta} & H_{1,m,\beta\beta} \end{pmatrix} \begin{pmatrix} C_{m\alpha}(\tau) \\ C_{m\beta}(\tau) \end{pmatrix} \tag{2.24}$$

Here, matrix elements are given by the following formulas (2.25) to (2.27).

[Expression 54]

$$H_{1,m,\alpha\alpha} = G_1(E_{TH} + (1 - x_m)h_{z,m}) + G_2 T_{m,\alpha\alpha} + G_3 T_{m,\alpha\alpha}^{(2)} \tag{2.25}$$

[Expression 55]

$$H_{1,m,\beta\beta} = G_1(E_{TH} - x_m h_{z,m}) + G_2 T_{m,\beta\beta} + G_3 T_{m,\beta\beta}^{(2)} \tag{2.26}$$

[Expression 56]

$$H_{1,m,\alpha\beta} = H_{1,m,\beta\alpha} = G_2 T_{m,\alpha\beta} + G_3 T_{m,\alpha\beta}^{(2)} \tag{2.27}$$

Parameters in the formulas (2.25) to (2.27) are given as follows. ETH is an energy term of the Hamiltonian to be solved and is defined by the formulas (2.28) to (2.30).

[Expression 57]

$$E_{TH} = E_Q + E_{TL} + C \tag{2.28}$$

[Expression 58]

$$E_Q = \langle \Psi | \hat{H}_Q | \Psi \rangle = \left\langle \psi \left| \sum_{j>i}^{N} W_{ij} \hat{\sigma}_i^z \hat{\sigma}_j^z \right| \Psi \right\rangle = \sum_{j>i}^{N} W_{ij} x_i x_j = \frac{1}{2} \sum_{i,j=1}^{N} W_{ij} x_i x_j \tag{2.29}$$

[Expression 59]

$$E_{TL} = \langle \psi | \hat{H}_{TL} | \Psi \rangle = \left\langle \psi \left| \sum_{i=1}^{N} b_i \hat{\sigma}_i^z \right| \Psi \right\rangle = \sum_{i=1}^{N} b_i x_i \tag{2.30}$$

Here, $h_{z,m}$ is an amount corresponding to a mean field and is given by the formulas (2.31) and (2.32).

[Expression 60]

$$h_{z,m} = v_m + b_m \tag{2.31}$$

[Expression 61]

$$v_m = \sum_{j=1}^{N} W_{mj} x_j \tag{2.32}$$

Energy caused by the transverse magnetic field term T (with $\hat{\ }$) is as in the formula (2.33).

[Expression 62]

$$E_0 = \langle \Psi | \hat{T} | \Psi \rangle = \left\langle \psi \left| \sum_{i=1}^{N} J_i \hat{\sigma}_i^x \right| \Psi \right\rangle = \sum_{i=1}^{N} J_i y_i \tag{2.33}$$

Energy of the Hamiltonian of the formula (2.2) of the high-order transverse magnetic field term given as the external magnetic field is given by the following formula (2.34).

[Expression 63]

$$E_{T2} = \langle \Psi | \hat{V}_{add} | \Psi \rangle = \left\langle \psi \left| \left( \sum_{i=1}^{N} J_i \hat{\sigma}_i^x \right)^2 \right| \Psi \right\rangle = \sum_{i=1}^{N} J_i^2 (1 - y_i^2) + \left( \sum_{i=1}^{N} J_i y_i \right)^2 \tag{2.34}$$

$T_{m,\alpha\alpha}$ is an expected value of the transverse magnetic field term and is obtained by extracting a coefficient of $C_{m\alpha}(\tau)$ from $\langle \alpha_m | x \langle \psi_m(\tau_0) | T | \psi \rangle$ (x is tensor product (x in circle), m of $\psi_m$ is overlined, T is with $\hat{\ }$). $T_{m,\alpha\beta}$ is obtained by extracting a coefficient of $C_{m\beta}(\tau)$ from $\langle \alpha_m | x \langle \psi_m(\tau_0) | T | \psi \rangle$ (x is tensor product (x in circle), m of $\psi_m$ is overlined, T is with $\hat{\ }$). Then, $T_{m,\beta\beta}$ is obtained by extracting a coefficient of $C_{m\beta}(\tau)$ from $\langle \alpha_m | x \langle \psi_m(\tau_0) | T | \psi \rangle$ (x is tensor product (x in circle), m of $\psi_m$ is overlined, T is with $\hat{\ }$). $T_{m,\alpha\alpha}^{(2)}$, $T_{m,\beta\beta}^{(2)}$, and $T_{m,\alpha\beta}^{(2)}$ are respectively given by the formulas (2.35) to (2.37).

[Expression 64]

$$T_{m,\alpha\alpha}^{(2)} = \sum_{i=1}^{N} J_i^2 + \left( \sum_{i=1}^{N} J_i y_i \right)^2 - \left( \sum_{i=1}^{N} J_i^2 y_i^2 \right) - 2 J_m y_m \left( \sum_{i=1}^{N} J_i y_i - J_m y_m \right) \tag{2.35}$$

25
-continued

[Expression 65]

$$T_{m,\alpha\alpha}^{(2)} = T_{m,\beta\beta}^{(2)} \qquad (2.36)$$

[Expression 66]

$$T_{m,\alpha\beta}^{(2)} = T_{m,\beta\alpha}^{(2)} = 2J_m \left( \sum_{i=1}^{N} J_i y_i - J_m y_m \right) \qquad (2.37)$$

Although the imaginary time evolution is performed according to the formula (2.24), unitality at this time (conservation of probability) is broken. Therefore, after the time evolution calculation, renormalization is performed so that the wave function becomes one.

Next, $\Omega_m(\tau)$ will be described. It is assumed that a probability that an $\alpha$ spin is observed with respect to an m-th spin be $P_{m,\alpha}$ and a probability that a $\beta$ spin is observed be $P_{m,\beta}$. $P_{m,\alpha}$ and $P_{m,\beta}$ are respectively represented by the formulas (2.38) and (2.39).

[Expression 67]

$$P_{m,\alpha} = x_i \qquad (2.38)$$

[Expression 68]

$$P_{m,\beta} = 1 - x_i \qquad (2.39)$$

The unitality (conservation of probability) is compulsorily saved in order to perform renormalization for each time evolution, (2.40) is satisfied.

[Expression 69]

$$P_{m,\alpha} + P_{m,\beta} = 1 \qquad (2.40)$$

Therefore, when a sum of observation probabilities is differentiated with respect to an imaginary time $\tau$, the formula (2.41) is obtained.

[Expression 70]

$$\frac{d}{d\tau}(P_{m,\alpha} + P_{m,\beta}) = M_m + M_m^* = 0 \qquad (2.41)$$

Therefore, $M_m^*$ is a pure imaginary number with no real number part. Here, it is assumed that $M_m^*$ be a complex conjugation of $M_m$.

Here, in a governing equation (2.24) of the time evolution, a case is considered where real numbers are selected for both of $C_{m\alpha}(\tau=0)$ and $C_{m\beta}(\tau=0)$ as the initial values of the wave function. All matrix elements on the right side of the formula (2.24) are real numbers. Therefore, if $C_{m\alpha}$ and $C_{m\beta}$ are real numbers, $C_{m\alpha}(\tau+\Delta\tau)$ $\Omega_m(\tau)$ is a real number. On the other hand, although $\Omega_m(\tau)$ is calculated from $M_m^*$, $M_m^*$ at the time $\tau$ is also a real number from the definition formula (2.21) of $M_m^*$. However, since $M_m^*$ becomes a pure imaginary number from the formula (2.41), $M_m^*=0$ in this case. Therefore, $\Omega_m(\tau)=1$. $C_{m\alpha}(\tau+\Delta\tau)$ is also a real number. $C_{m\beta}(\tau+\Delta\tau)$ is a real number according to the completely similar argument.

Next, a case will be considered where the initial values $C_{m\alpha}(\tau=0)$ and $C_{m\beta}(\tau=0)$ of the wave function are determined as complex numbers. In this case, $M_m^*$ is given as a complex number. In this case, typically, $\Omega_m(\tau) \neq 1$ and is a complex number. Then, $M_m^*$ is an amount determined from the m-th spin. Therefore, $\Omega_m(\tau)$ is determined from information regarding all spins other than the m-th spin to be focused. Therefore, $C_{m\alpha}(\tau+\Delta\tau)$ is affected by wave functions of all the other spins $C_{i\alpha}(\tau)$ and $C_{i\beta}(\tau)$ for satisfying immediately previous i≠m. For example, in a case where the phase information is incorporated into information regarding a wave function at a time $\tau=0$ and is set to be the complex number, information is exchanged via an imaginary part. A phase part that does not affect the observation probability defined by a square of an absolute value plays an important role in interaction between spins. Then, this interaction couples with all the other spins and entangles with all the other spins one another via the phase part.

<Physical Meaning of Imaginary Time Evolution and Quantum Mechanical Simulated Annealing>

In the framework of the imaginary time evolution, as in the formula (1.19), a time defined by a real number is converted into an imaginary. At this time, it has been already described that, if a quantum mechanical time evolution operator is caused to act on the wave function, the formula (1.20) is obtained in a case of $\tau \gg 1$. It is considered that the formula (1.20) corresponds to the formula (2.42) that is the Boltzmann distribution.

[Expression 71]

$$\rho = \exp\left(-\frac{E}{k_B T}\right) \qquad (2.42)$$

From a correspondence relationship at this time, the formula (2.43) is obtained.

[Expression 72]

$$T = \frac{\hbar}{k_B \tau} \qquad (2.43)$$

From here, it is understood that a case of $\tau \to \infty$ corresponds to $T \to 0$. In this sense, the imaginary time evolution can be regarded as one kind of simulated annealing that is quantum mechanically extended. Such a solution search method is the QTSA method.

<About Quantum Annealing Schedule>

It is said that an annealing schedule is important when quantum annealing is performed. In the imaginary time propagation, a process is repeated in which real time evolution for changing $G_2$ is performed, then, the imaginary time evolution including energy dissipation is performed, and a lowest energy state with the given $G_2$ is obtained. Here, a schedule of the real time evolution for changing $G_2$ is important. For example, the schedule of the time evolution can be exponential. For example, (2.44) is obtained here.

[Expression 73]

$$G_2 = t^{-c} \qquad (2.44)$$

For example, it is assumed that c (c is real number) be a value proportional to $N^{-1}$. Since adiabatic transition is not required in the imaginary time propagation, c and $N^{-1}$ do not need to have a proportional relationship.

<Usefulness of Nonlinear External Magnetic Field>

Next, usefulness of the nonlinear external magnetic field in the QA method will be described. First, as a problem to be verified, the traveling salesman problem (TSP) defined as an Ising model of an N spin system is considered.

FIG. 8 is a diagram illustrating an example of an 8-city TSP. In FIG. 8, problem data 41 that defines a problem of the 8-city TSP is illustrated. In the problem data 41, x and y coordinates indicating a position of a city is set in association with a city number (city No.) of each of the eight cities. Such an 8-city TSP is expressed as a 64-qubit system. A city visiting order that is one optimum solution for this problem is cities $1 \rightarrow 2 \rightarrow 3 \rightarrow 4 \rightarrow 5 \rightarrow 6 \rightarrow 7 \rightarrow 8$. The optimal value at this time is $-2.5023$.

In a case where the TSP problem in FIG. 8 is solved, for example, a quantum annealing Hamiltonian (2.1) formula in which a nonlinear external magnetic field is added to the quantum annealing Hamiltonian defined by the formula (1.1) can be defined. By performing quantum trials 400 times for each of the formula (1.1) and the formula (2.1), and it is verified whether or not the probability of obtaining the ground state is improved.

Figure 9:
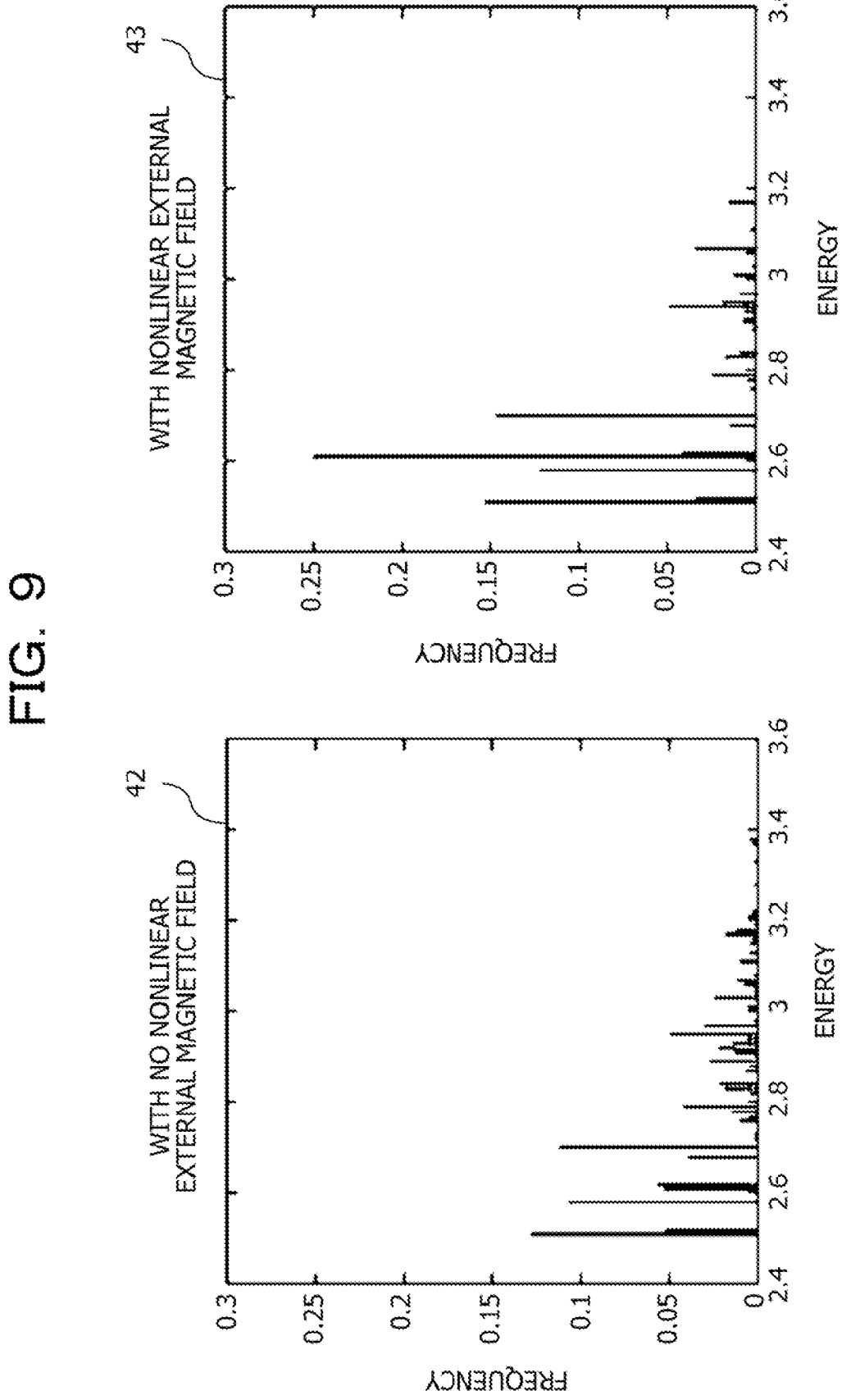
FIG. 9 is a diagram illustrating an example of a solution search result of the 8-city TSP.

FIG. 9 is a diagram illustrating an example of a solution search result of the 8-city TSP. A graph 42 illustrates a result of performing 400 times of the quantum trials for the quantum annealing Hamiltonian including only the first-order transverse magnetic field term as in the formula (1.1). A graph 43 illustrates a result of performing 400 times of the quantum trials for the quantum annealing Hamiltonian including the second-order transverse magnetic field term as in the formula (2.1). The graphs 42 and 43 illustrate histograms of energy obtained as the result of the 400 times of quantum trials. The horizontal axes of the graphs 42 and 43 indicate energy, and the vertical axes indicate the number of times of quantum trials through which the energy is obtained.

As illustrated in FIG. 9, a case where the quantum annealing is performed using the formula (2.1) including the nonlinear transverse magnetic field term has a higher ratio at which the energy becomes the minimum value. For example, it is found that the probability of obtaining the ground state is improved by including the nonlinear transverse magnetic field term. Furthermore, in the graph 42, 49 kinds of states are obtained as the end states (49 patterns of obtained energy). In the graph 43, 26 kinds of states are obtained as the end states (26 patterns of obtained energy). Therefore, it is found that the quantum annealing according to the formula (2.1) including the nonlinear transverse magnetic field term has a smaller number of states obtained as the end states.

<Regarding Transition of Energy in Case Where Quantum Phase Transition Occurs>

Next, a transition of energy in a case where a quantum phase transition occurs will be described.

Figure 10:
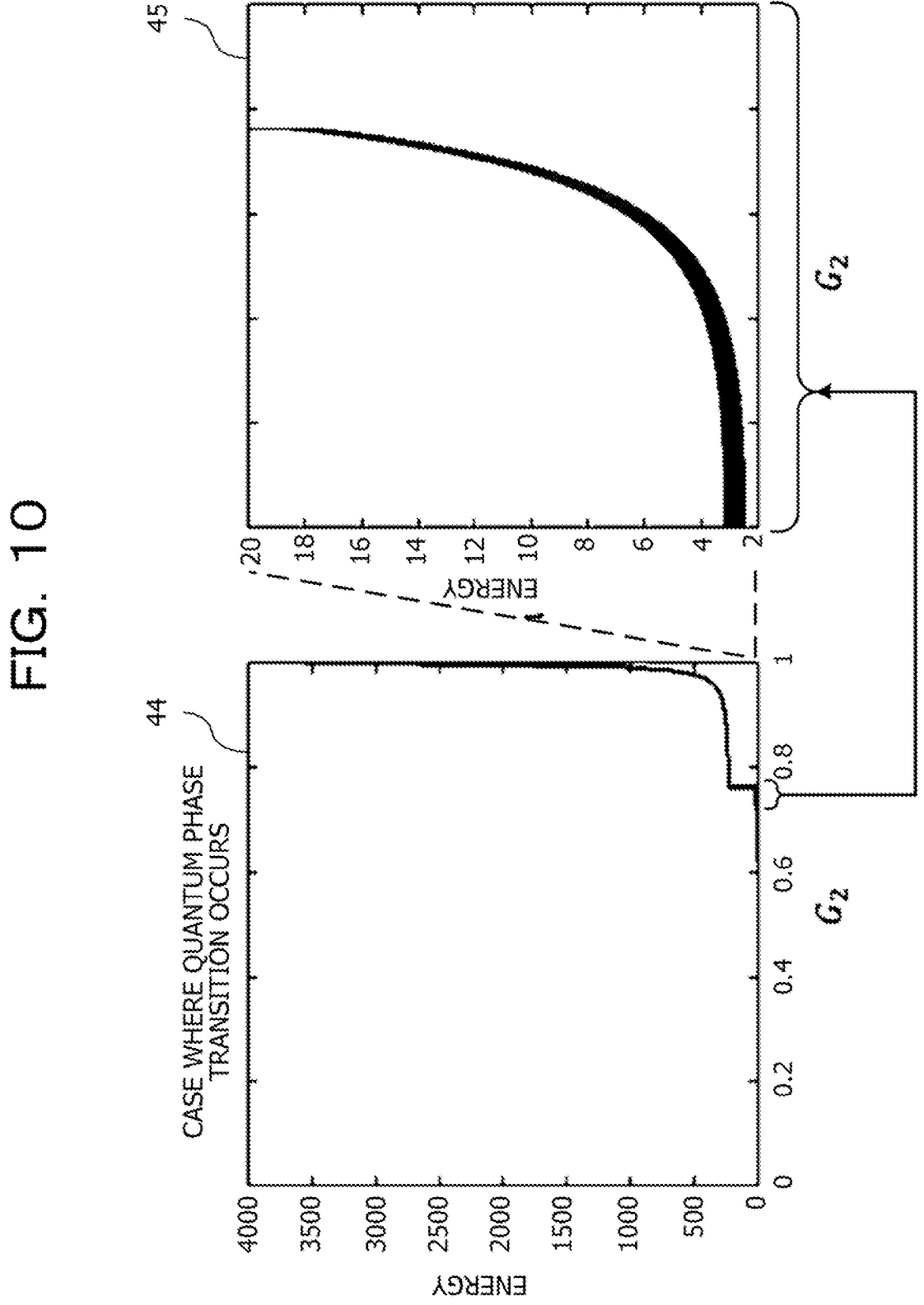
FIG. 10 is a diagram illustrating a total energy value of a system obtained as a function of $G_2$.

FIG. 10 is a diagram illustrating a total energy value of a system obtained as a function of $G_2$. A graph 44 illustrates an energy value according to $G_2$ in a case where the quantum phase transition occurs. A graph 45 is a diagram illustrating energy for $G_2$ after the quantum phase transition has occurred in the graph 44. The graph 45 is an enlarged view of the graph 44. The horizontal axes of the graphs 44 and 45 indicate $G_2$, and the vertical axes indicate energy.

$G_2$ is a kind of an adiabatic variable. When the quantum trial is performed, a phenomenon called "quantum phase transition" occurs near $G_2=0.744$. Although this value is not fixed, it is found that the phenomenon occurs in a very narrow range of about $G_2=0.743\pm0.001$ in the graph 44.

Then, if the value of $G_2$ is decreased after the quantum phase transition has occurred, $G_2$ converges to an eigenstate of the Hamiltonian to be solved (corresponding to state of classical Ising model) at the limit of $G_2=0$. However, the value converges to a state including the ground state and the excited state.

Importantly, once the quantum phase transition occurs, the state no longer transitions to another quantum state. The fate of the system is determined according to $G_2=0.743\pm0.001$ at which the quantum phase transition occurs. Conversely, after the quantum phase transition has occurred, it is not needed to seriously perform annealing. For example, even if the value of $G_2$ is very roughly reduced after the quantum phase transition has occurred, the final result no longer changes.

The schedule of the quantum annealing is, for example, defined by exponentiation and is reduced. However, it is not required to strictly observe this annealing schedule. Although calculations should be carefully performed before the quantum phase transition occurs, the fate of the system has been already determined after the quantum phase transition has occurred. Therefore, when it is assumed that the value of $G_2$ at which the quantum phase transition occurs be $G_{20}$, the calculation after the quantum phase transition has occurred can be determined through linear interpolation, for example, as in the formula (3.1).

[Expression 74]

$$G_2 = G_{20}\left(1 - \frac{n}{m}\right) \tag{3.1}$$

Here, m is a natural number indicating a division number. The reference n is a natural number indicating how many times $G_2$ is updated after the quantum phase transition, and it is assumed that $n=1, 2, \ldots,$ and m. Note that, in extreme cases, the fate of the system is determined after the first-order quantum phase transition has occurred. Therefore, $m=2$ may be set. For example, if the schedule of the quantum annealing is strictly observed, a larger calculation amount is required as $G_2$ becomes smaller. However, in the framework of the QTSA method, such a requirement is not made. Therefore, after the quantum phase transition has occurred, the calculation amount can be reduced as in the formula (3.1).

When this result is applied to an actual device of the quantum-annealing-type quantum computer, it is understood that it is sufficient to determine the following parameters for the annealing schedule. The parameters are a sweep start time $t_{start}$ and a sweep end time $t_{end}$ of an external magnetic field that is the transverse magnetic field, a time $t_{qpt}$ when the annealing schedule of the magnetic field is changed, and an annealing schedule function s (t). However, it is assumed that $G_2=1.0$ at $t_{start}$, $G_2=0$ at $t_{end}$, and $G_2=G_{20}$ at $t_{qpt}$. $G_{20}$ changes depending on a problem to be solved, the strength $G_2$ of the transverse magnetic field term with which the quantum phase transition occurs and the spins are reversed at the same time is $G_{20}$. In the example in the graph 44, the value of $G_2$ in a portion where energy rapidly drops is $G_{20}$. In a section $[t_{start}, t_{qpt}]$, the value of $G_2$ changes according to $G_2(t)=s(t)$, and $1.0=s(t_{start})$ and $G_{20}=s(t_{end})$ are satisfied. In a section $[t_{qpt}, t_{end}]$, another high-speed annealing schedule $G_2(t)=s_1(t)$ may be used.

Figure 11:
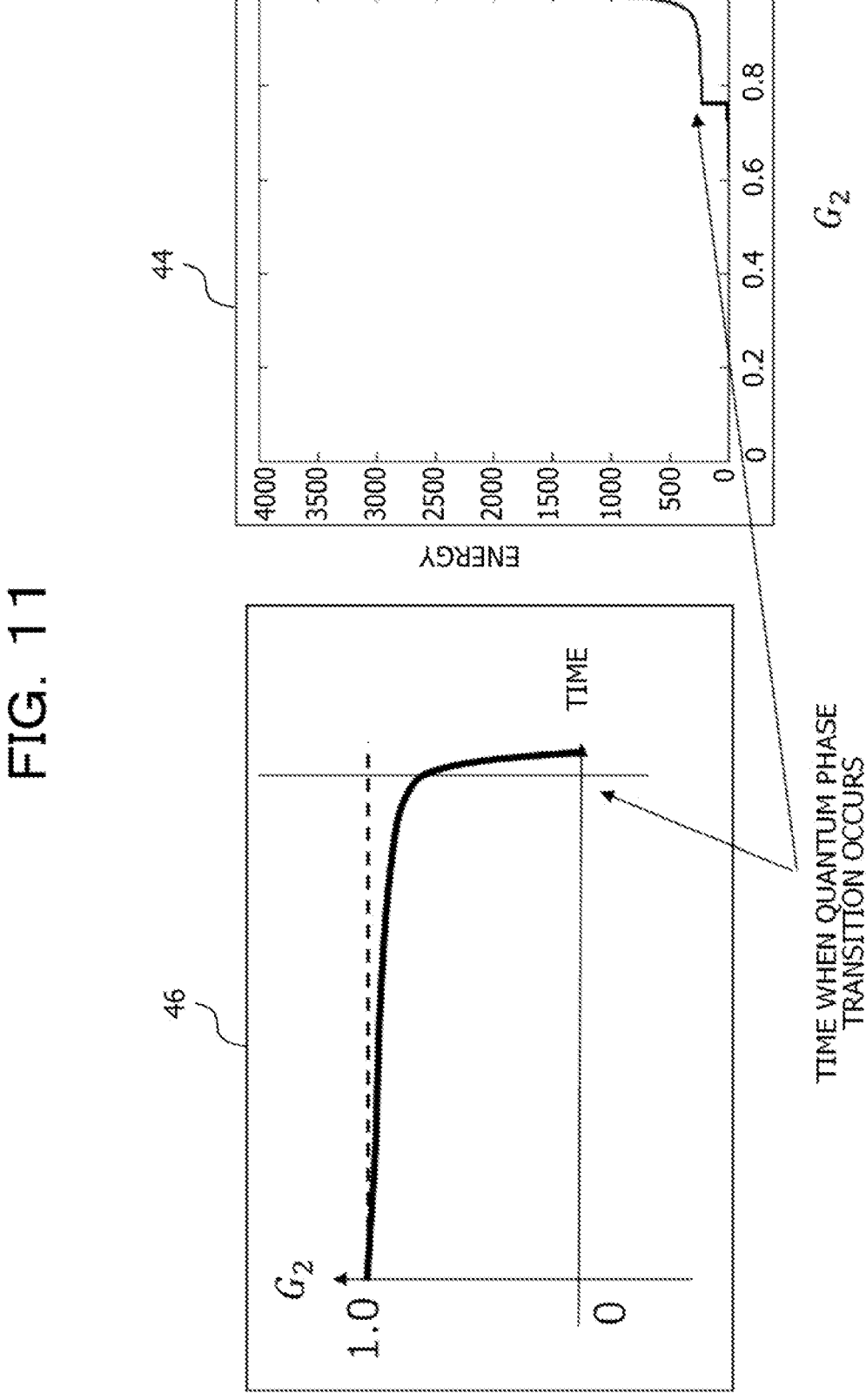
FIG. 11 is a diagram illustrating an example of a temporal change of an external magnetic field.

FIG. 11 is a diagram illustrating an example of a temporal change of the external magnetic field. A graph 46 illustrates a relationship between a simulation time and the external magnetic field $G_2$ in the horizontal axis. The horizontal axis of the graph 46 indicates the time, and the vertical axis indicates the external magnetic field $G_2$. It is assumed that the time progresses by a unit time when the external magnetic field $G_2$ is updated, for example. In the graph 46, the external magnetic field $G_2$ sharply drops since a time when the quantum phase transition occurs (time when energy rapidly drops in graph 44 illustrated in FIG. 10).

It is sufficient for a user to specify a sweep start time and a sweep end time of the magnetic field, a time when the quantum phase transition occurs, and a scheduling function.

Figure 12:
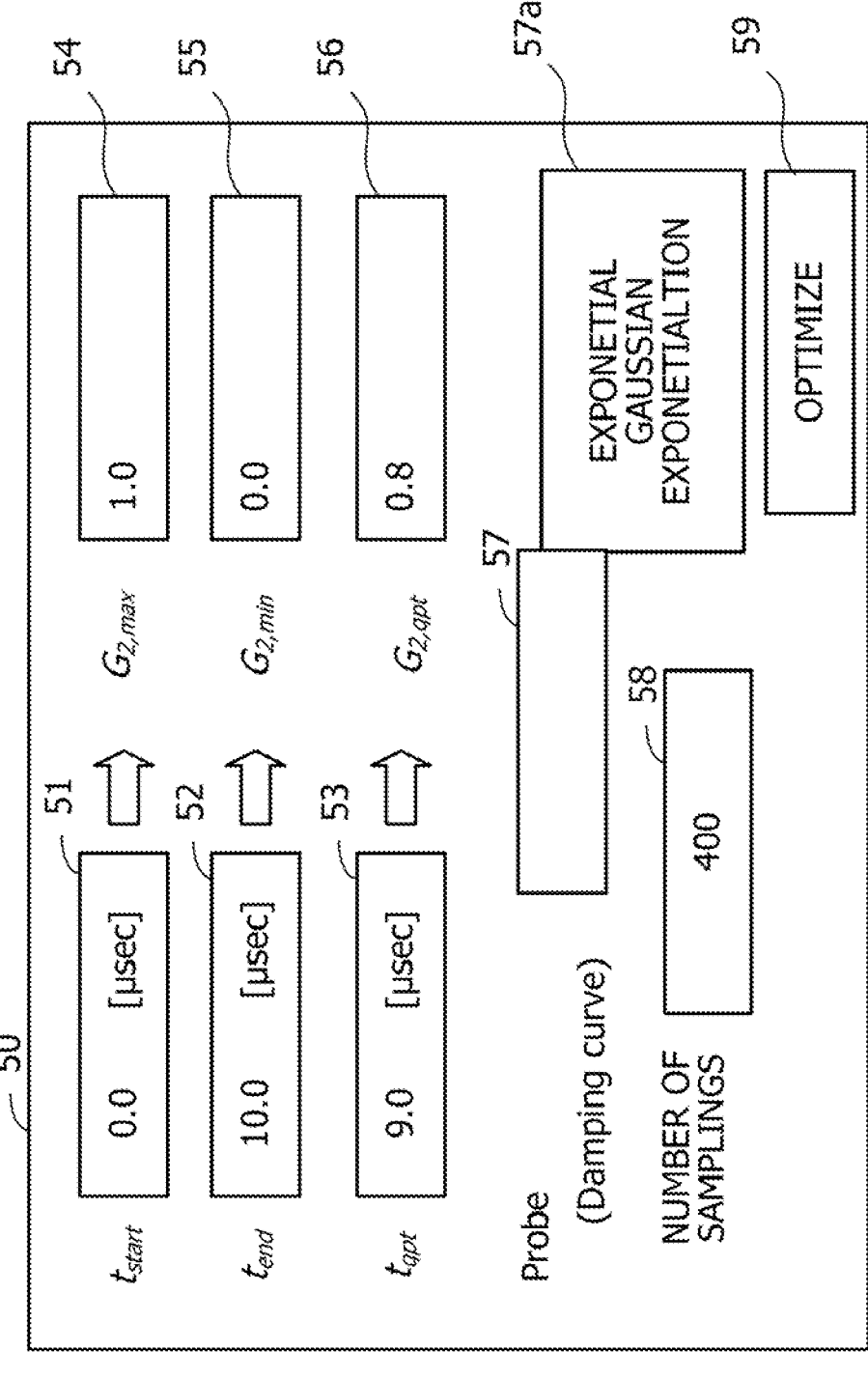
FIG. 12 is a diagram illustrating an example of an analysis condition setting screen.

FIG. 12 is a diagram illustrating an example of an analysis condition setting screen. For example, the classical computer 100 displays the analysis condition setting screen 50 on the monitor 21 and receives an analysis condition setting input from the user.

In the analysis condition setting screen 50, text boxes 51 to 58 for analysis condition input and a button 59 for instructing execution are provided. The text box 51 is a region where the sweep start time $t_{start}$ is set. The text box 52 is a region where the sweep end time $t_{end}$ is set. The text box 53 is a region where the time $t_{qpt}$ when the annealing schedule of the magnetic field is changed is set.

The text box 54 is a region where a maximum value $G_{2, max}$ of the external magnetic field $G_2$ is set. In the text box 54, for example, "1.0" is set as an initial value. The text box 55 is a region where a minimum value $G_{2, min}$ of the external magnetic field $G_2$ is set. In the text box 55, for example, "0.0" is set as an initial value. The text box 56 is a region where a value ($G_{2, qpt}$) of the external magnetic field $G_2$ at the time when the annealing schedule of the magnetic field is changed is set. For example, the classical computer 100 may calculate $G_{2, qpt}$ according to the value set in the text box 53 and set the calculation result as an initial value of the text box 56.

The text box 57 is an input region of the annealing schedule function applied before the time when the annealing schedule of the magnetic field is changed. For example, a list of available functions is displayed in a pull-down menu 57a, and the user can select any function from the pull-down menu 57a. The function selected on the pull-down menu 57a is set to the text box 57. The text box 58 is a region where the number of times of quantum trials is set.

By pressing the button 59 after setting information for specifying analysis conditions to the text boxes 51 to 58, the user can instruct the classical computer 100 to search for a solution for a problem of obtaining the ground state of the Ising model.

What is important here is a point that, although the annealing schedule is important before the quantum phase transition occurs, when the quantum phase transition occurs once and the spins are reversed at the same time, the subsequent annealing may be performed at high speed. This is because the fate of the system is determined at the time when the quantum phase transition occurs.

Therefore, what is important is the value of $G_{20}$ (for example, $t_{qpt}$). The value of $G_{20}$ is determined depending on the strength J of the spin magnetism. By changing the strength J of the spin magnetism, the value of $G_{20}$ at which the quantum phase transition occurs changes. As the value of $G_{20}$ is closer to zero, calculation takes more time. As the value of $G_{20}$ is closer to one, calculation can be performed at higher speed, but with less accuracy. Therefore, an optimum value of $G_{20}$ exists. Therefore, it is required to set the strength J of the spin magnetism so as to be the value of $G_{20}$ useful for calculation.

In order to obtain an appropriate strength of the spin magnetism, the classical computer 100 controls the quantum-annealing-type quantum computer 200 and performs sampling a certain number of times, for example, while changing the strength J of the spin and records the results. As a result of sampling, a spin arrangement is obtained. The classical computer 100 can calculate the total energy of the Ising model using the sampling results. Then, a frequency of obtaining the lowest energy state is obtained. Among them, it is sufficient to determine a value of J with the highest frequency of obtaining the lowest energy.

Figure 13:
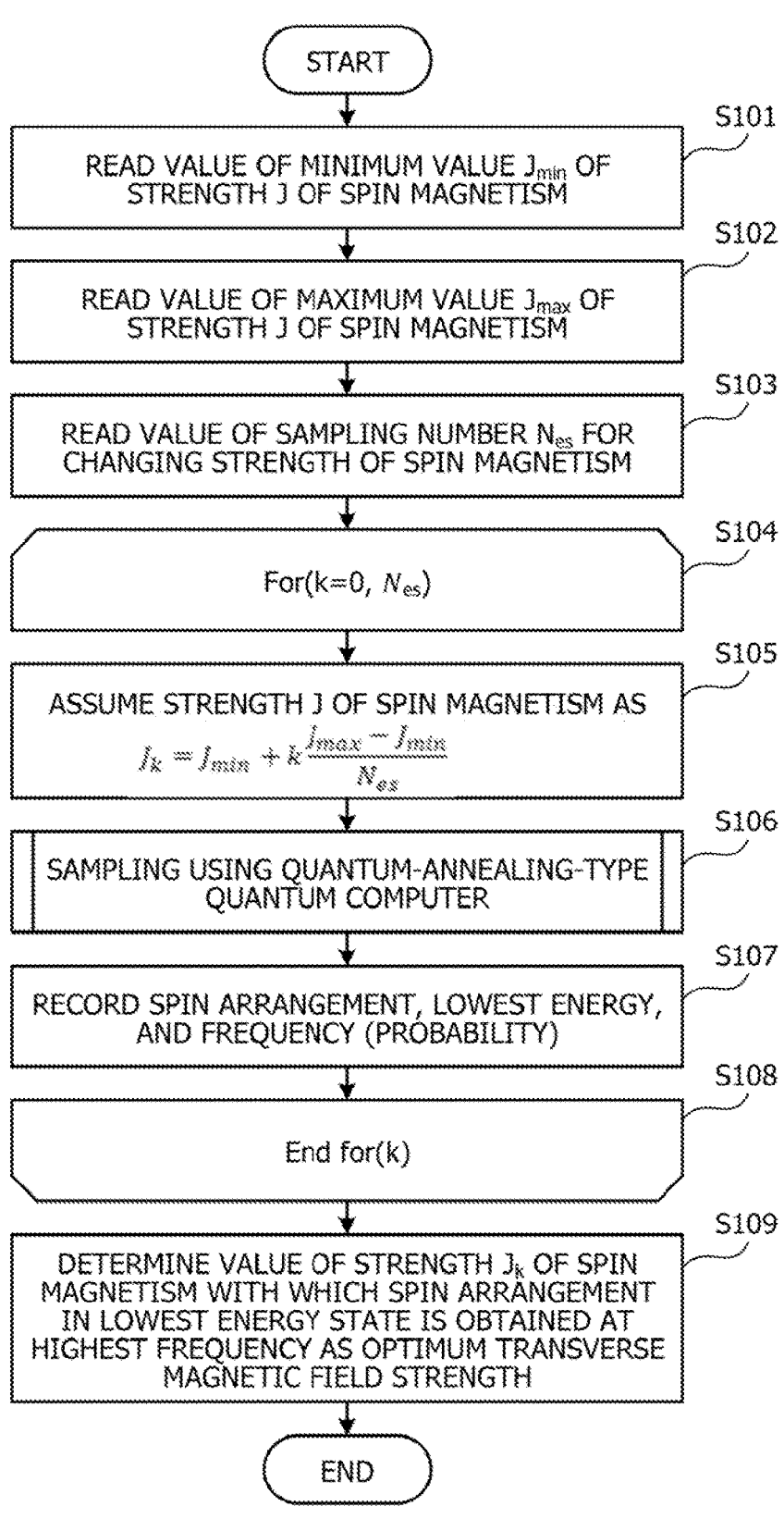
FIG. 13 is a flowchart illustrating an example of a procedure of spin magnetism strength determination processing.

FIG. 13 is a flowchart illustrating an example of a procedure of spin magnetism strength determination processing. Hereinafter, the processing illustrated in FIG. 13 will be described in accordance with step numbers.

[Step S101] The processing unit 120 of the classical computer 100 reads a value of a minimum value $J_{min}$ of the strength J of the spin magnetism from the storage unit 110.

[Step S102] The processing unit 120 reads a value of a maximum value $J_{max}$ of the strength J of the spin magnetism from the storage unit 110.

[Step S103] The processing unit 120 reads a value of a sampling number $N_{es}$ for changing the transverse magnetic field strength from the storage unit 110.

[Step S104] The processing unit 120 repeats processing in steps S105 to S107 while incrementing a value of k until a variable k indicating the number of loops changes from zero to $N_{es}$.

[Step S105] The processing unit 120 obtains the strength of the spin magnetism according to the formula (3.2).

[Expression 75]

$$J_k = J_{min} + k \frac{J_{max} - J_{min}}{N_{es}} \qquad (3.2)$$

[Step S106] The processing unit 120 executes sampling processing using the quantum-annealing-type quantum computer 200. At this time, the processing unit 120 can determine an optimum $t_{qpt}$ at the same time as the sampling processing. Details of this processing will be described later (refer to FIGS. 14 and 15).

[Step S107] The processing unit 120 records information obtained through the sampling processing in the storage unit 110. The information obtained through the sampling processing includes a spin arrangement, the lowest energy, a frequency (probability) of reaching the lowest energy, or the like.

[Step S108] The processing unit 120 proceeds the processing to step S109 when the number of loops k reaches $N_{es}$.

[Step S109] The processing unit 120 determines a value of a strength $J_k$ of the spin magnetism with which a spin arrangement in the lowest energy state is obtained at the highest frequency as an optimum transverse magnetic field strength, from the obtained frequency data.

In this way, the optimum transverse magnetic field strength is determined. Note that, in the processing in step S106 illustrated in FIG. 13, it is possible to control the quantum-annealing-type quantum computer 200 and determine $t_{qpt}$ at the same time. For example, the processing unit 120 inputs the sweep start time $t_{start}$ and the end time $t_{end}$ of the external magnetic field (transverse magnetic field) and determines a schedule function s (t), and then, changes $t_{qpt}$. Then, the processing unit 120 determines $t_{qpt}$ in a sweep schedule of the magnetic field of which a probability at which the lowest energy state is obtained becomes the highest.

Hereinafter, the sampling processing involving the determination of $t_{qpt}$ will be described in detail with reference to FIG. 14.

Figure 14:
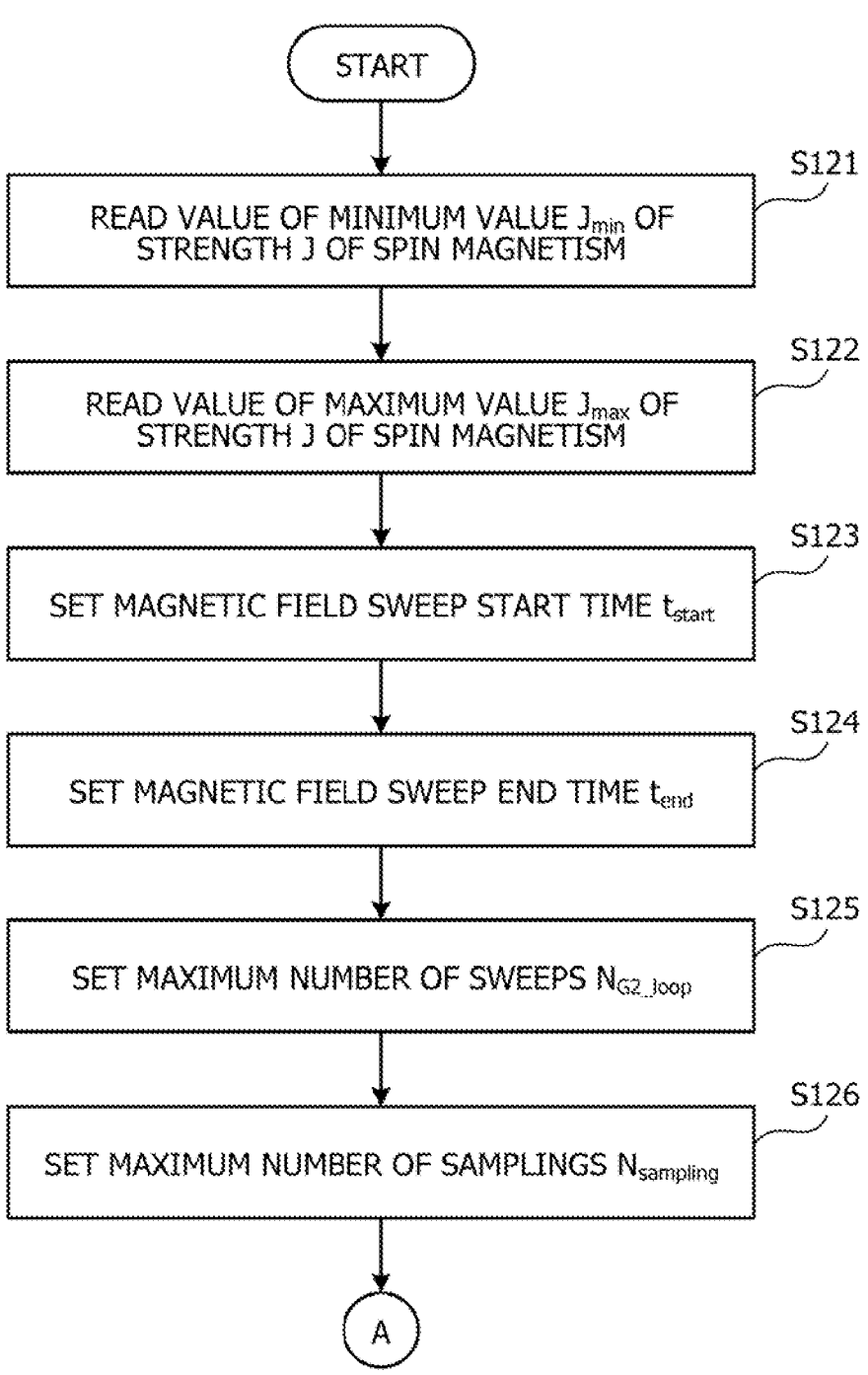
FIG. 14 is a first half of a flowchart illustrating an example of a procedure of sampling processing involving determination of $t_{qpt}$.

FIG. 14 is a first half of a flowchart illustrating an example of a procedure of the sampling processing involving the determination of $t_{qpt}$. Hereinafter, the processing illustrated in FIG. 14 will be described in accordance with step numbers.

[Step S121] The processing unit 120 reads the value of the minimum value $J_{min}$ of the strength J of the spin magnetism from the storage unit 110.

[Step S122] The processing unit 120 reads the value of the maximum value $J_{max}$ of the strength J of the spin magnetism from the storage unit 110.

[Step S123] The processing unit 120 sets the magnetic field sweep start time $t_{start}$ as a parameter. For example, the processing unit 120 sets the magnetic field sweep start time $t_{start}$ input on the analysis condition setting screen 50.

[Step S124] The processing unit 120 sets the magnetic field sweep end time $t_{end}$ as a parameter. For example, the processing unit 120 sets the magnetic field sweep end time $t_{end}$ input on the analysis condition setting screen 50.

[Step S125] The processing unit 120 sets the maximum number of sweeps $N_{G2\_loop}$ as a parameter. The maximum number of sweeps $N_{G2\_loop}$ is specified by a user in advance, for example.

[Step S126] The processing unit 120 sets the maximum number of samplings $N_{sampling}$ as a parameter. For example, the processing unit 120 sets a value of the number of quantum trials input on the analysis condition setting screen 50 as the maximum number of samplings $N_{sampling}$. Thereafter, the processing unit 120 proceeds the processing to step S131 (refer to FIG. 15).

Figure 15:
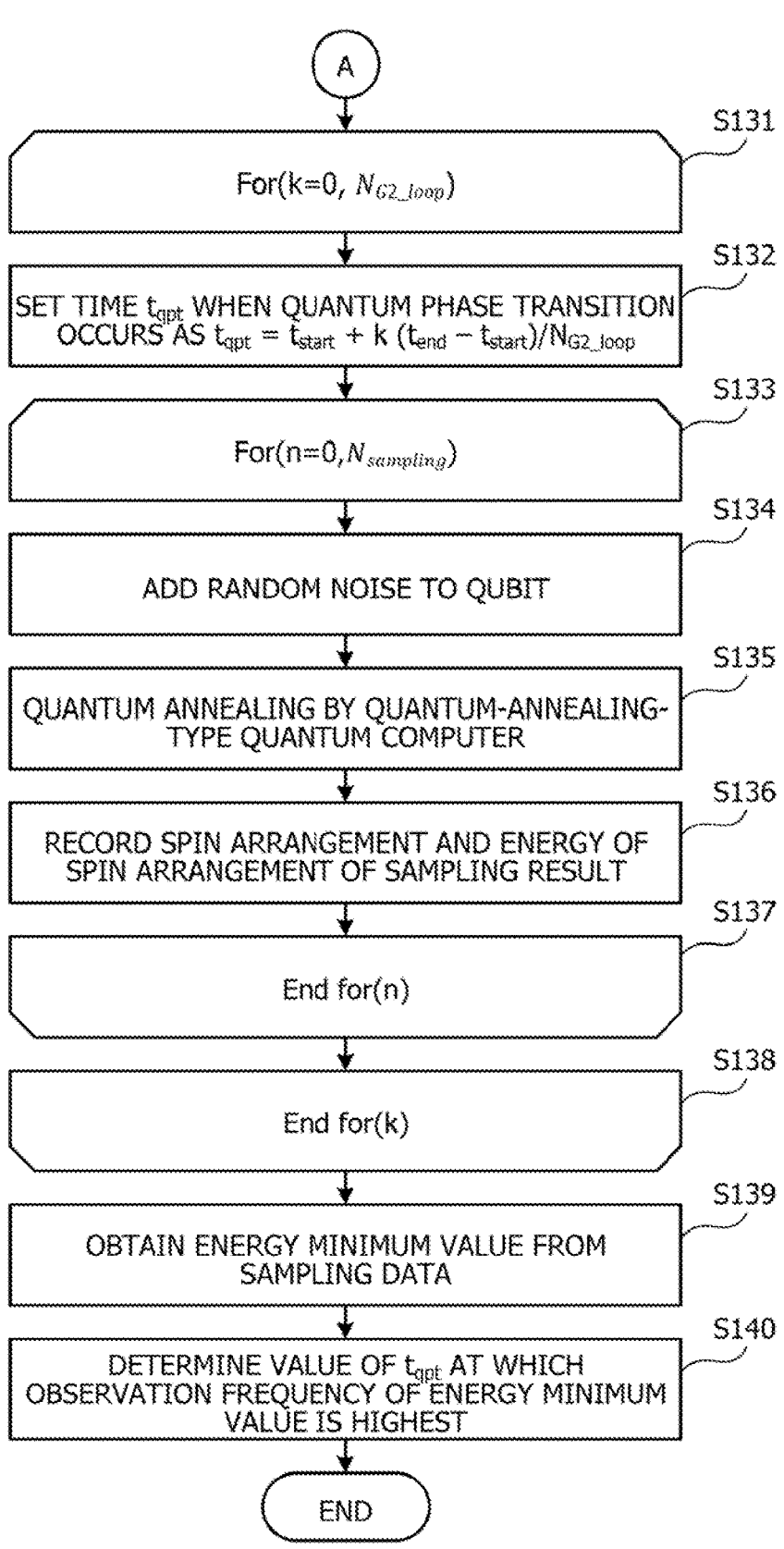
FIG. 15 is a second half of the flowchart illustrating an example of the procedure of the sampling processing involving the determination of $t_{qpt}$.

FIG. 15 is a second half of the flowchart illustrating an example of the procedure of the sampling processing involving the determination of $t_{qpt}$. Hereinafter, the processing illustrated in FIG. 15 will be described in accordance with step numbers.

[Step S131] The processing unit 120 repeats processing in steps S132 to S137 while incrementing the value of the variable k until the variable k indicating the number of loops changed from zero to $N_{G2\_loop}$.

[Step S132] The processing unit 120 sets a time $t_{qpt}$ when the quantum phase transition occurs according to the formula (3.3).

[Expression 76]

$$t_{qpt} = t_{start} + k \frac{t_{end} - t_{start}}{N_{G2\_loop}} \qquad (3.3)$$

[Step S133] The processing unit 120 repeats processing in steps S134 to S136 while incrementing a value of a variable n until the variable n indicating the number of loops changes from zero to $N_{sampling}$.

[Step S134] The processing unit 120 adds random noise to a qubit in an initial state.

[Step S135] The processing unit 120 causes the quantum-annealing-type quantum computer 200 to execute processing for searching for the ground state of the Ising model through the quantum annealing from the qubit to which the random noise is added. The processing unit 120 acquires the result of the search processing from the quantum-annealing-type quantum computer 200 as sampling data.

[Step S136] The processing unit 120 records a spin arrangement indicated in the sampling result and energy in the spin arrangement in the storage unit 110.

[Step S137] The processing unit 120 proceeds the processing to step S138 when the value of n indicating the number of loops reaches $N_{sampling}$.

[Step S138] The processing unit 120 proceeds the processing to step S139 when the value k indicating the number of loops reaches $N_{G2\_loop}$.

[Step S139] The processing unit 120 obtains the energy minimum value from among the sampling data.

[Step S140] The processing unit 120 determines $t_{qpt}$ at which the observation frequency of the energy minimum value is the highest as $t_{qpt}$ in the sweep schedule of the magnetic field with the highest probability of obtaining the lowest energy state.

In this way, $t_{qpt}$ is determined. Note that the probability of obtaining the lowest energy state depends on not only the magnetic strength J of the spin alone but also how noise is given. Therefore, the probability that the lowest energy state is obtained depends on a noise model in a case where the user explicitly gives noise and also depends on noise characteristics of a quantum processing unit (QPU) used by the quantum-annealing-type quantum computer 200. Therefore, typically, it is required to change the annealing method each time when the QPU is changed.

Figure 16:
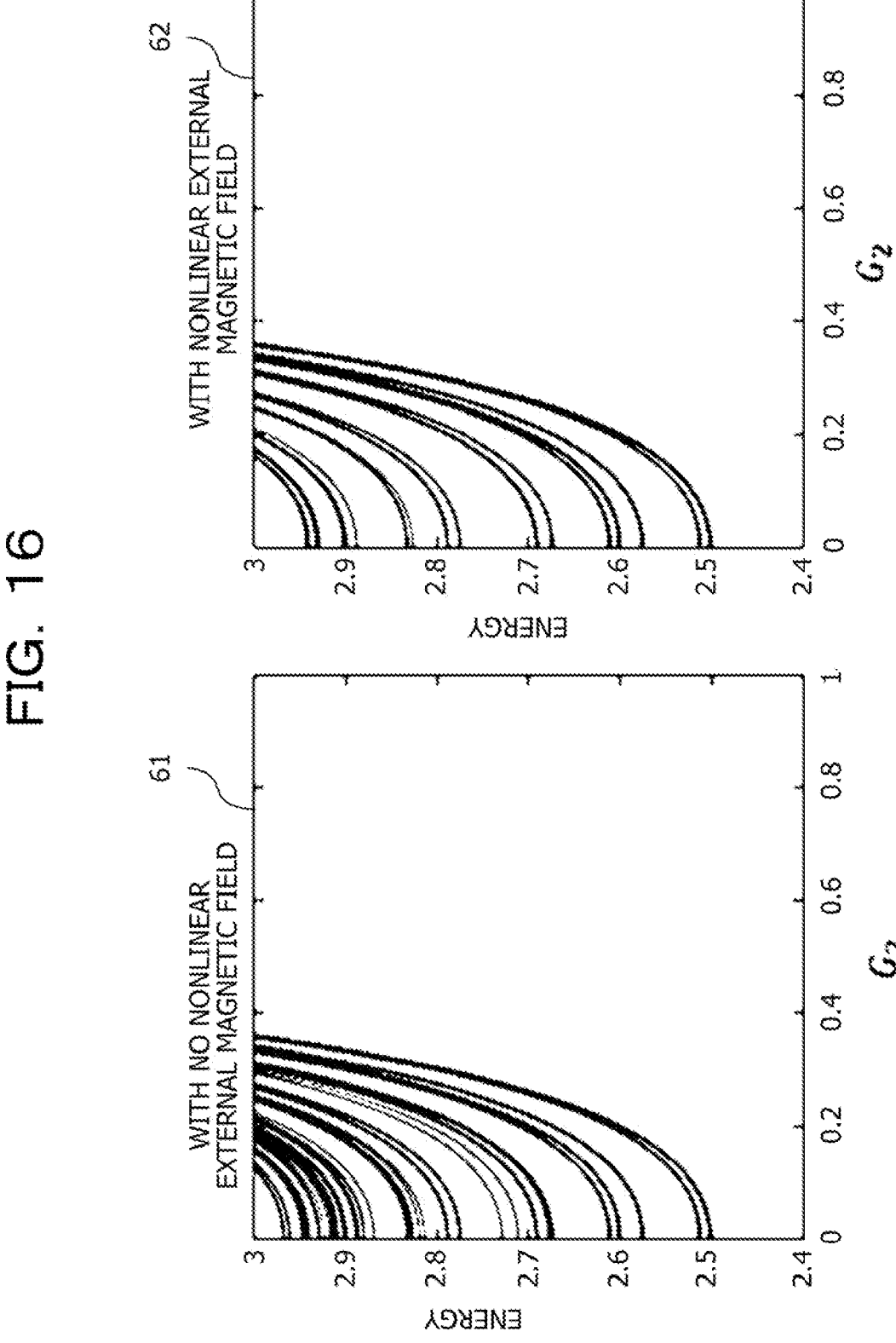
FIG. 16 is a diagram illustrating an adiabatic potential regarding $G_2$ in a case where a (1.1)-type transverse magnetic field term and a (2.1)-type nonlinear transverse magnetic field are included.

FIG. 16 is a diagram illustrating an adiabatic potential regarding $G_2$ in a case where a (1.1)-type transverse magnetic field term and a (2.1)-type nonlinear transverse magnetic field term are included. A graph 61 illustrates the adiabatic potential in a case where the (1.1)-type transverse magnetic field term is included (no nonlinear external magnetic field). A graph 62 illustrates an adiabatic potential in a case where a (2.1)-type nonlinear transverse magnetic field term is included (with nonlinear external magnetic field). The horizontal axes of the graphs 61 and 62 indicate the value of $G_2$, and the vertical axes indicate energy. When the graphs 61 and 62 are compared, it is understood that the number of quantum states obtained as a result is larger in a case where the nonlinear magnetic field is included.

What is important here is to control the value of $G_2$ that causes the quantum phase transition. If the value of $G_{20}$ is too close to one, the quantum phase transition occurs in a situation where a change amount of the value of $G_2$ is large. In this case, dispersion of a finally obtained energy value increases. Conversely, if the value of $G_{20}$ is too close to zero, then, an effect of the transverse magnetic field becomes too small, and the dispersion of the finally obtained energy value increases. Therefore, it is empirically appropriate to adjust the value of $G_{20}$ to be within about $0.5 \leq G_{20} \leq 0.8$. Therefore, the processing unit 120 adjusts the strength $J = J_i$ of the transverse magnetic field to be the target value of $G_{20}$ while changing the strength $J = J_i$ of the transverse magnetic field.

<Optimization of Energy Difference Accompanying Imaginary Time Evolution>

Here, the reason why the number of quantum states obtained as the end state in a case where the nonlinear transverse magnetic field is introduced will be described. This can be easily described by understanding concept of avoided-crossing and the Zeeman effect.

Figure 17:
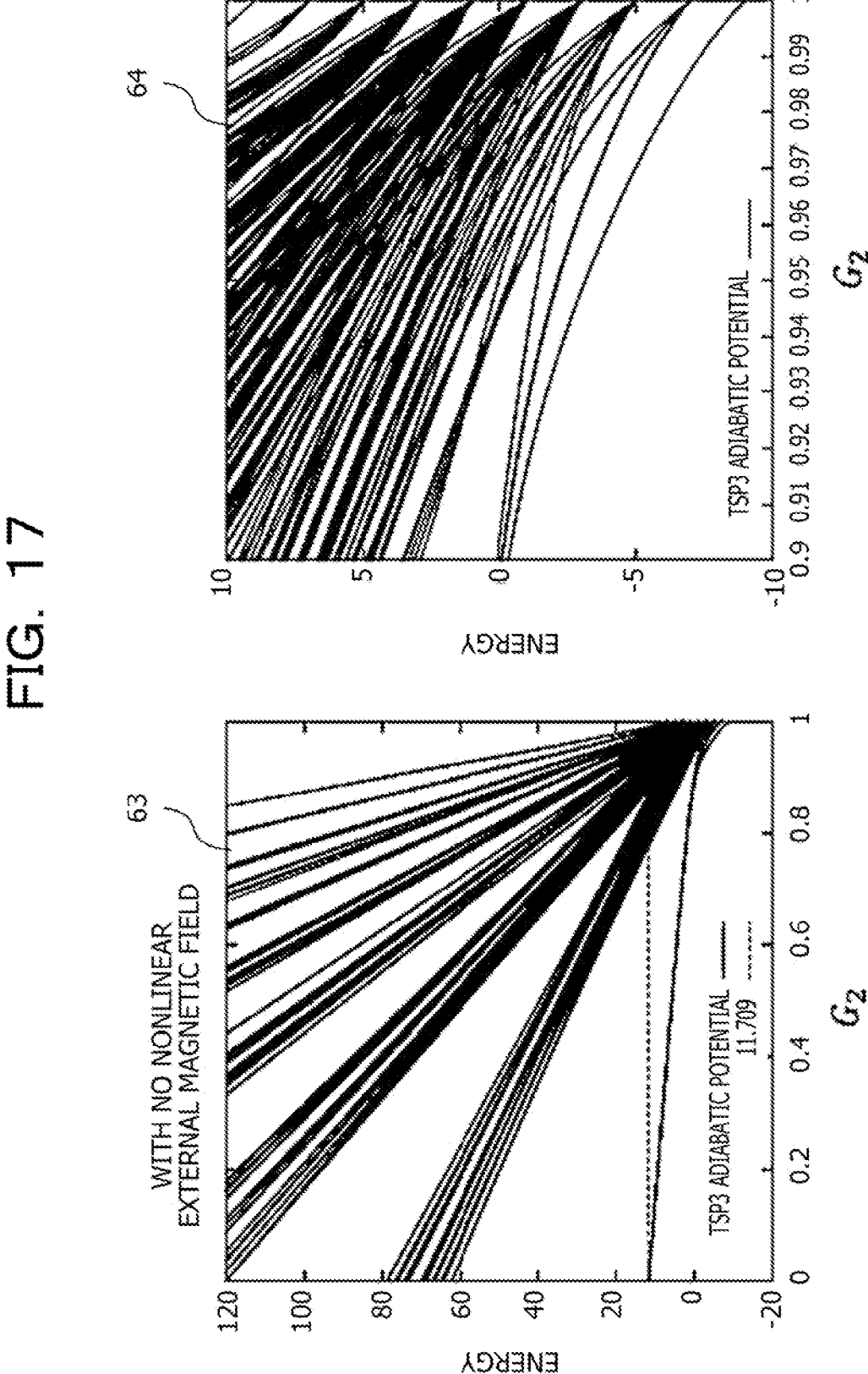
FIG. 17 is a diagram illustrating an example of potential energy regarding a strength $G_2$ of a transverse magnetic field.

FIG. 17 is a diagram illustrating an example of potential energy regarding the strength $G_2$ of the transverse magnetic field. Horizontal axes of graphs 63 and 64 indicate $G_2$, and the vertical axes indicate potential energy. The graph 64 is an enlarged partial view of the graph 63.

In the example in FIG. 17, a 3-city TSP is used as a simple example. Coordinates of respective cities in the 3-city TSP are respectively (−1, 0), (4, 0), and (0, 2). When this TSP problem is converted into an Ising model, a minimum value of the energy gives a minimum path. In a case of this problem, the minimum energy is 5+3√5≈11.708. A solution of this problem is 11.709.

In the example in FIG. 17, by performing conversion into a Hamiltonian matrix format including the transverse magnetic field term and diagonalizing it, an energy eigenvalue is obtained. For example, the Hamiltonian (1.1) formula is directly diagonalized using $2^N$ basis functions defined from |000000000> to |111111111> as a basis function (basis function). From the graph 63, it is found that the energy continuously changes from $G_2$=1 to $G_2$=0 and becomes 11.708 that is the solution of the problem at $G_2$=0.

Curves indicated in the graphs 63 and 64 are referred to as an adiabatic potential when $G_2$ is assumed as an adiabatic variable. Furthermore, a specific adiabatic potential may be referred to as a channel. For example, the adiabatic potential in the ground state may be referred to as a ground channel. Here, a channel related to energy $E_n$ is referred to as a channel (n). A case of n=0 is the ground state.

In a case of the problem used in the example in FIG. 17, even in the first excited state at $G_2$=1, it is possible to reach the ground state. Here, looking carefully at the graph 64, there is a portion where the adiabatic potentials seem to cross.

Figure 18:
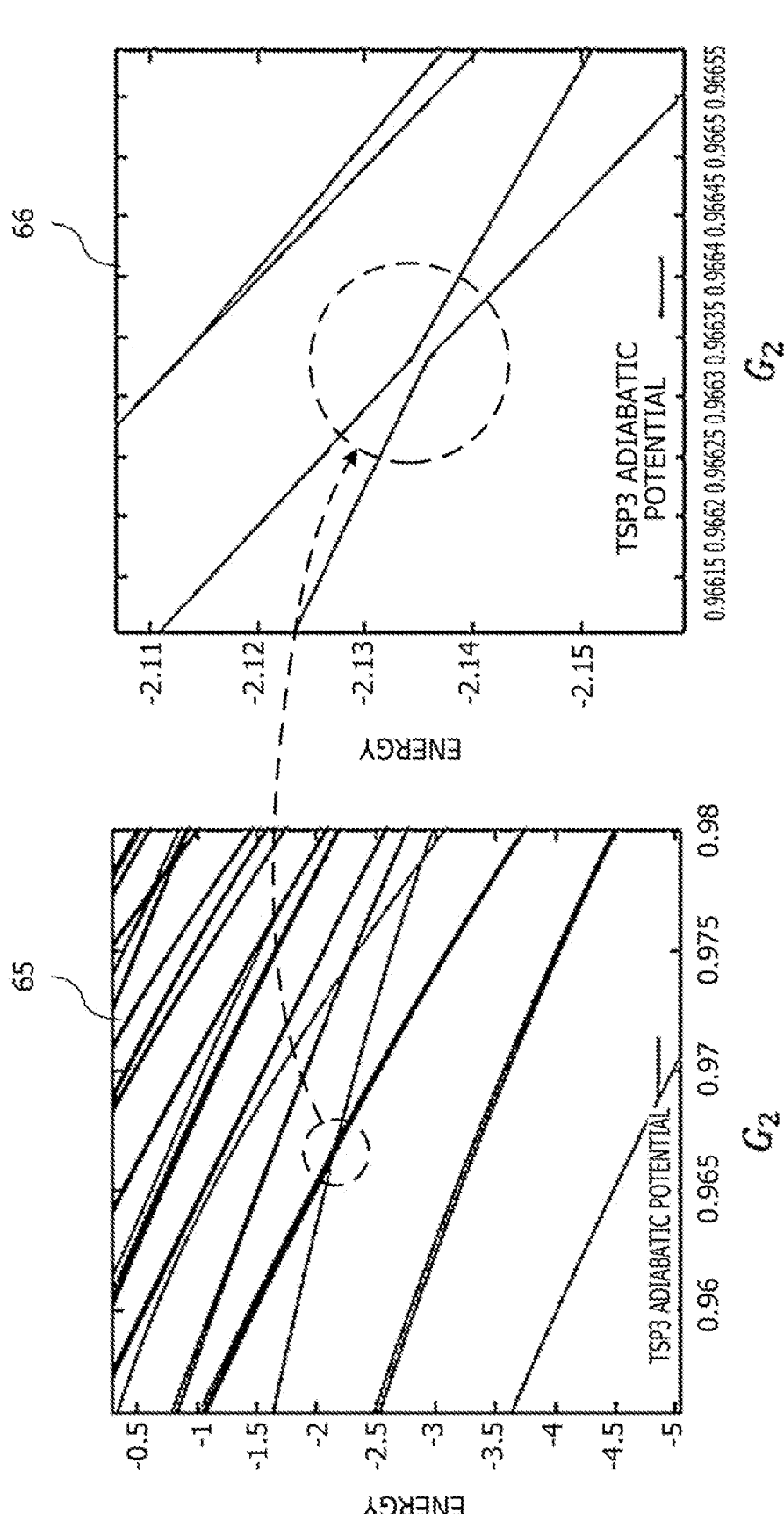
FIG. 18 is an enlarged view of a portion where the adiabatic potentials cross.

FIG. 18 is an enlarged view of the portion where the adiabatic potentials cross. A graph 65 is a graph enlarged by one step, and a graph 66 is further enlarged than the graph 65.

In the graph 65, the adiabatic potentials seem to cross. near $G_2$=0.967. However, as understood by looking at the enlarged graph 66, the adiabatic potentials do not actually cross. A phenomenon that the adiabatic potentials seem to cross and do not actually cross in this way is referred to as avoided crossing. The avoided crossing induces a transition to the excited state in the quantum annealing. For example, the avoided crossing substantially degenerates in calculation with finite precision. Therefore, in a region where the avoided crossing occurs, it is required to slow down the annealing schedule regarding $G_2$ and reduce $G_2$ to be sufficiently smaller than an energy difference $\Delta E_1 = E_1 - E_0$ of the avoided crossing.

This energy structure is determined by the Hamiltonian (1.1) formula. Therefore, a nonlinear magnetic field term is introduced to solve this.

Figure 19:
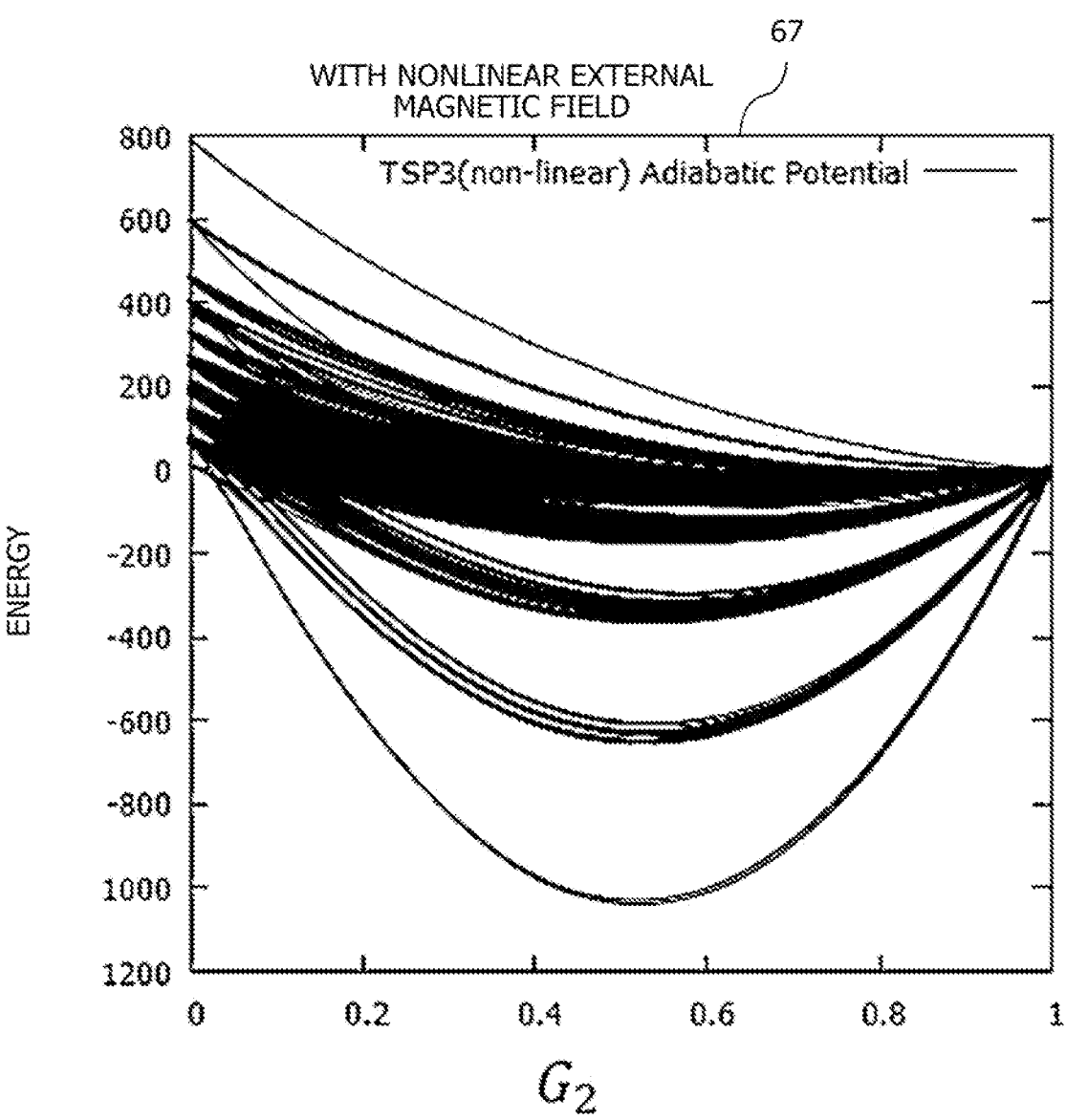
FIG. 19 is a diagram illustrating an example in which a Hamiltonian (2.1) formula including a second-order transverse magnetic field as a nonlinear term is diagonalized.

FIG. 19 is a diagram illustrating an example in which a Hamiltonian (2.1) formula including a second-order transverse magnetic field as a nonlinear term is diagonalized. The horizontal axis of a graph 67 indicates $G_2$, and the vertical axis indicates energy.

When the graph 67 is compared with the example in FIG. 17, it is understood that the structures of the adiabatic potentials are largely different. For example, it is understood that an energy difference between the ground state and the first excited state is large near $G_2$=0.5. The reason why the energy difference is maximized near $G_2$=0.5 is that $G_3$ is set as indicated in the formula (5.1).

[Expression 77]

$$G_3 = 100G_2(1 - G_2) \qquad (5.1)$$

This is natural because the nonlinear external magnetic field is maximized at $G_2$=0.5 in the formula (5.1). What is important is that the energy difference can be increased by introducing the external magnetic field. As the energy difference increases, it is difficult to cause excitation. This means that the probability of causing the excitation to an unintended excited state at the time of quantum annealing can be reduced. The TSP3 is a problem in that, even if the avoided crossing occurs, the state converges to the ground state. For example, even if the state belongs to the first excited state at $G_2$=0, it is understood that the state converges to a state of E=11.704. However, the situation totally changes in a case of a 4-city TSP.

Figure 20:
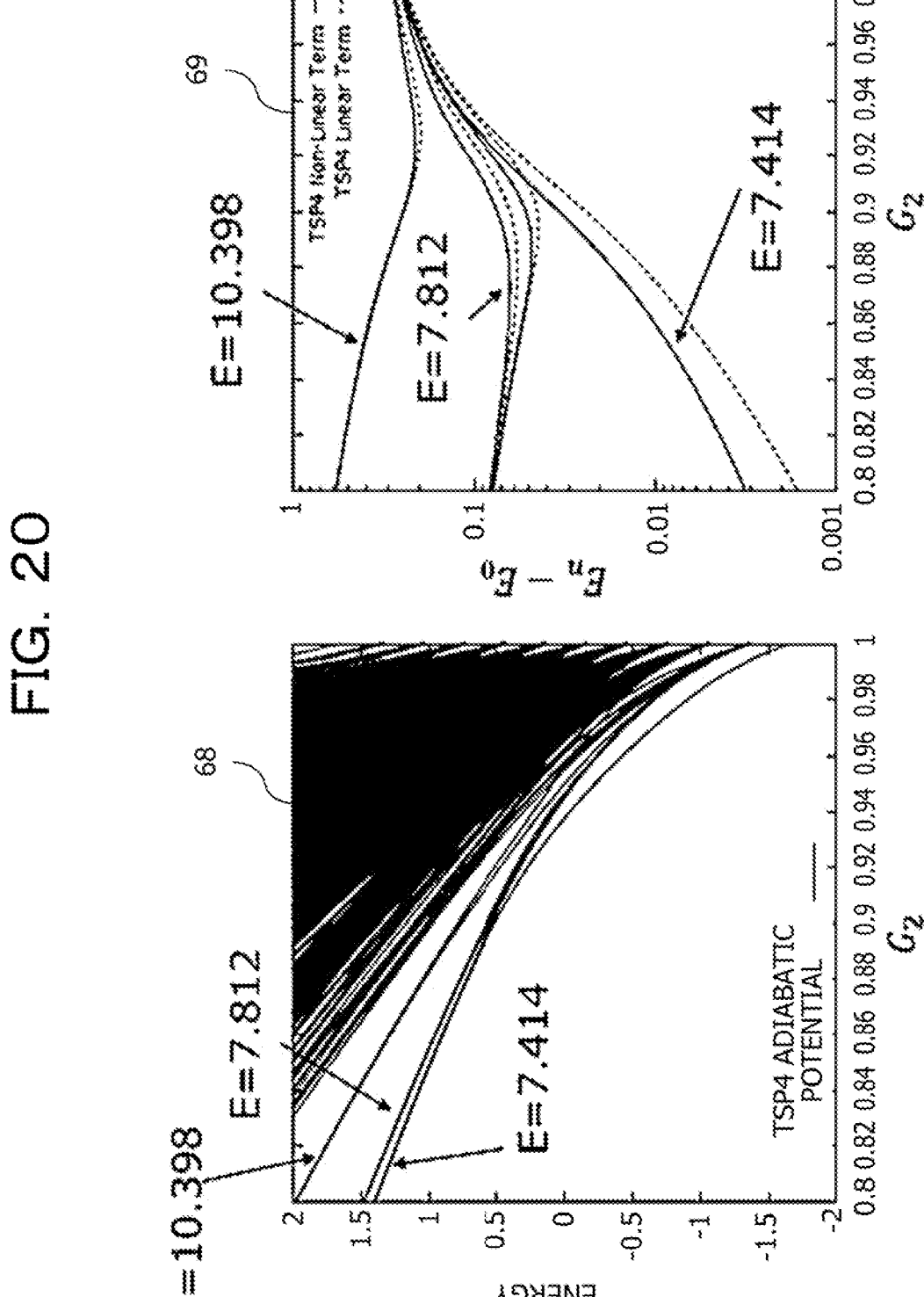
FIG. 20 is a diagram illustrating a difference between an energy level, energy $E_n$ in an n-th excited state, and energy $E_0$ in the ground state in a case of the 4-city TSP.

FIG. 20 is a diagram illustrating a difference between an energy level, energy $E_n$ in an n-th excited state, and energy $E_0$ in the ground state in a case of the 4-city TSP. It is understood that the energy in the ground state at $G_2$=0 avoided-crosses the first excited state near $G_2$=0.9. A graph 68 illustrates the energy level in a case of the 4-city TSP. The horizontal axis of the graph 68 indicates $G_2$, and the vertical axis indicates energy. A graph 69 illustrates a difference between the energy $E_n$ in the n-th excited state and the energy $E_0$ in the ground state in a case of the 4-city TSP. The horizontal axis of the graph 69 indicates $G_2$, and the vertical axis indicates $E_n - E_0$.

When a convergent solution when the imaginary time evolution is performed near $G_2$=0.9 in the quantum annealing is set as an initial condition at $G_2$=0.9−δ, energy in the initial state is higher than these two states if the value of δ is not sufficiently small. If the imaginary time evolution is performed in this state, it becomes random whether to reach a quantum state with E=7.414 or a state with E=7.812.

In this case, a drainage divide at which it is determined whether to reach the quantum state with E=7.414 or the quantum state with E=7.812 can be seen from the graph 69. In a region of $G_2$ where the avoided crossing occurs, each of $\Delta E_1$ and $\Delta E_2$ is branched into two. One reaches E=7.414. Another one reaches E=7.812. The graph 69 is a diagram that gives a condition regarding an energy difference that guarantees to reach the ground state through the imaginary time evolution. The imaginary time evolution is performed on a certain $G_2$, and the obtained end state is assumed as an initial state at $G_2$−δ. At this time, the energy in the initial state slightly increases. However, if the value is within a region in which $\Delta E_1$ converges to 7.414, the calculation converges to the ground state. For example, the quantum annealing schedule for changing $G_2$ should be determined from the energy change amount so that the energy in the initial state at $G_2$−δ is equal to or less than a certain value.

Therefore, the processing unit 120 determines $G_2$ so as to be smaller than a specified threshold while calculating the energy as in the flowchart illustrated in FIG. 13, when changing $G_2$. Note that, in the graph 69, the dotted line indicates a result of a linear transverse magnetic field, and the solid line indicates a result of including a nonlinear magnetic field. In a case where the nonlinear magnetic field is included, the energy difference is constantly larger than the linear magnetic field. Therefore, there is an effect of increasing a convergence region.

Therefore, since the energy largely changes if $G_2$ is changed too much, a transition to a channel with higher energy easily occurs. If the transition to the channel with higher energy occurs, when $G_2$ is decreased, and when the quantum phase transition occurs, spins are reversed to make a spin arrangement different from that in the lowest energy state. Therefore, how to weaken the value of $G_2$ requires to determine a threshold $\varepsilon_1$ in advance and to perform calculation so as to satisfy $\Delta E = |E(G_2-\delta) - E(G_2)| \le \varepsilon_1$ between energy $E(G_2-\delta)$ in the end state at $G_2-\delta$ and energy $E(G_2)$ in the end state at $G_2$.

Figure 21:
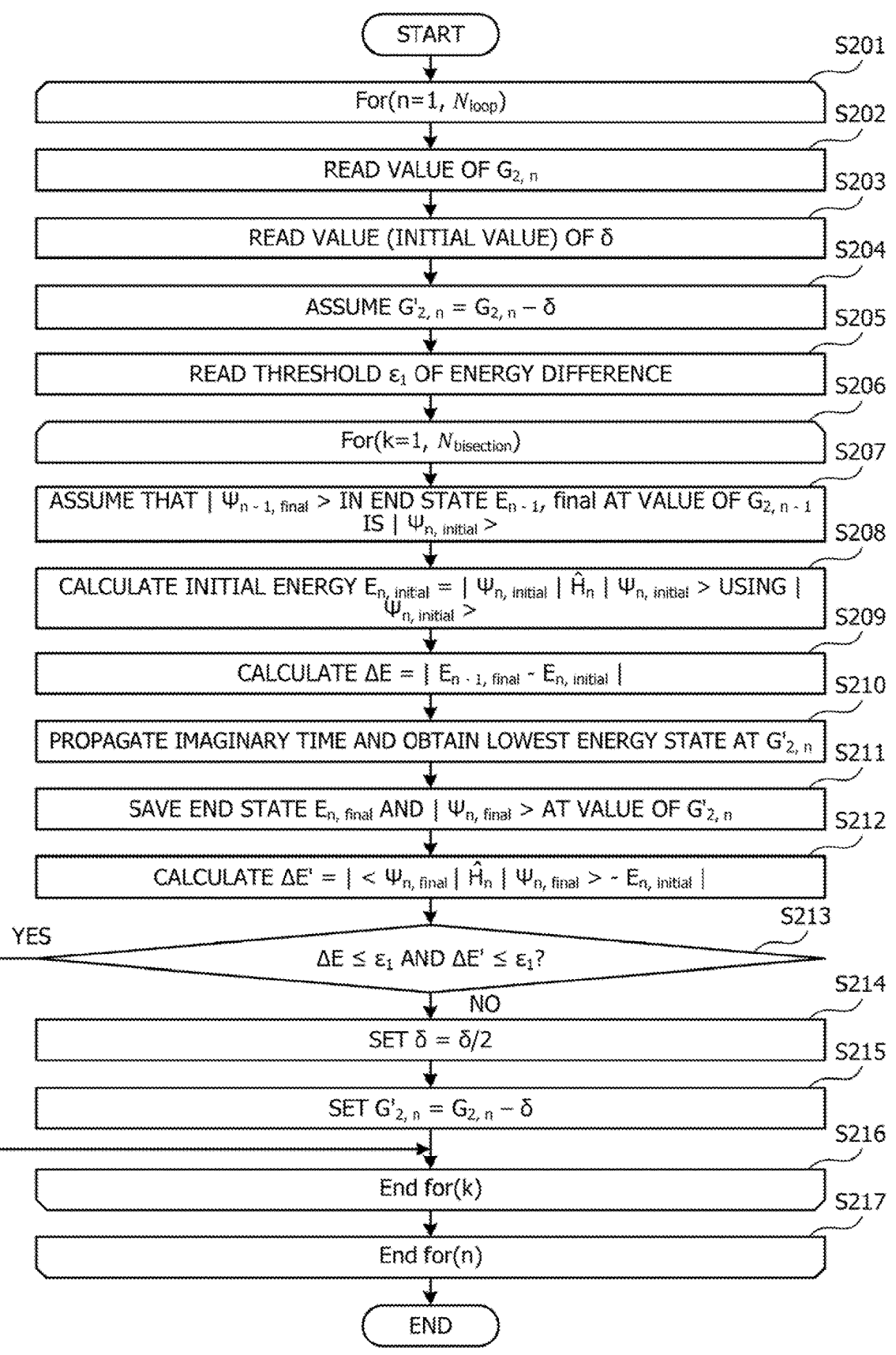
FIG. 21 is a flowchart illustrating an example of a procedure for weakening $G_2$.

FIG. 21 is a flowchart illustrating an example of a procedure for weakening $G_2$. Hereinafter, processing illustrated in FIG. 21 will be described in accordance with step numbers.

[Step S201] The processing unit 120 repeats processing in steps S202 to S216 while incrementing the value of the variable n until the variable n indicating the number of loops changes from one to $N_{loop}$. $N_{loop}$ is a natural number given in advance.

[Step S202] The processing unit 120 reads a value of $G_{2,\,n}$ ($G_2$ in n-th quantum trial).

[Step S203] The processing unit 120 reads an initial value of the value of $\delta$.

[Step S204] The processing unit 120 initializes $G'_{2,n}$ assuming $G'_{2,\,n} = G_{2,\,n} - \delta$.

[Step S205] The processing unit 120 reads the threshold $\varepsilon_1$ of the energy difference. The threshold $\varepsilon_1$ is a preset real number.

[Step S206] The processing unit 120 repeats processing in steps S207 to S215 while incrementing the value of the variable k until the variable k indicating the number of loops changes from one to $N_{bisection}$. $N_{bisection}$ is a natural number given in advance.

[Step S207] The processing unit 120 assumes that $|\Psi_{n-1,\,final}\rangle$ in an end state $E_{n-1,\,final}$ at the value of $G_{2,\,n-1}$ is $|\Psi_{n,\,initial}\rangle$.

[Step S208] The processing unit 120 calculates initial energy $E_{n,\,initial} = |\Psi_{n,\,initial}|H|\Psi_{n,\,initial}\rangle$ (H is with ^) using $|\Psi_{n,\,initial}\rangle$.

[Step S209] The processing unit 120 calculates $\Delta E = |E_{n-1,\,final} - E_{n,\,initial}|$.

[Step S210] The processing unit 120 propagates an imaginary time and obtains the lowest energy state at $G'_{2,\,n}$.

[Step S211] The processing unit 120 saves the end state $E_{n,\,final}$ and $|\Psi_{n-1,\,final}\rangle$ at the value of $G'_{2,\,n}$.

[Step S212] The processing unit 120 calculates $\Delta E' = |\langle \Psi_{n,\,final}|H_n|\Psi_{n,\,final}\rangle - E_{n,\,initial}|$ (H is with ^).

[Step S213] The processing unit 120 determines whether or a condition $\Delta E \le \varepsilon_1$ and $\Delta E' \le \varepsilon_1$ is satisfied. In a case where the condition is satisfied, the processing unit 120 proceeds the processing to step S216. Furthermore, in a case where the condition is not satisfied, the processing unit 120 proceeds the processing to step S214.

[Step S214] The processing unit 120 updates the value of $\delta$ to $\delta/2$ ($\delta = \delta/2$).

[Step S215] The processing unit 120 sets $G'_{2,\,n}$ to $G_{2,\,n-\delta}$ ($G'_{2,\,n} = G_{2,\,n} - \delta$).

[Step S216] The processing unit 120 proceeds the processing to step S217 when the value of the variable k reaches $N_{bisection}$.

[Step S217] The processing unit 120 ends the processing when the value of the variable n reaches $N_{loop}$.

In this way, it is possible to set $G_2$ to be small so that the quantum state does not transition to the excited channel.

Note that, from the result as illustrated in FIG. 9, it can be seen that a probability of obtaining a low energy state including the ground state increases by adding the nonlinear transverse magnetic field. However, not only the ground state is obtained. The cause is related to an order of the transverse magnetic field term.

In order to describe this principle, an example of a 4-spin system will be described. Now, for simplicity, a state of $|0000\rangle$ of the 4-spin system is considered. When this quantum state is multiplied by a time evolution operator $\exp\{-T\Delta t\}$ (T is with ^) of the imaginary time, the formula (5.2) is obtained.

[Expression 78]

$$\exp\{-\hat{T}\Delta t\}|0000\rangle \cong (1 - \hat{T}\Delta t)|0000\rangle = |0000\rangle - \Delta t(|0000\rangle + |0100\rangle + \quad (5.2)$$
$$|0010\rangle + |0001\rangle) + O(\Delta t^2)$$

By multiplying the transverse magnetic field operator, a state such as $|1000\rangle$ in which one spin is reversed is obtained. By multiplying the transverse magnetic field operator for the second time, the formula (5.3) is obtained.

[Expression 79]

$$\exp\{-\hat{T}\Delta t\}(\exp\{-\hat{T}\Delta t\}|0000\rangle) = |0000\rangle - 2\Delta t(|1000\rangle + |0100\rangle + \quad (5.3)$$
$$|0010\rangle + |0001\rangle) + 0(\Delta t^2)$$

Although it seems that two-particle excitation occurs, the two-particle excitation does not occur actually. A governing term is still $|0000\rangle$, a coefficient of a term of one-particle excitation that is proportional to $\Delta t$ is only amplified by the number of calculations. For example, "the two-particle excitation is substantially ignored".

Next, what happens if an operator is set as $T+T^2$ (both Ts are with ^) will be considered. The Suzuki-Trotter decomposition is given as the formula (5.4) in a range of the first-order.

[Expression 80]

$$\exp\{-(\hat{T} + \hat{T}^2)\Delta t\} = 1 - (\hat{T} + \hat{T}^2)\Delta t + 0(\Delta t^2) \quad (5.4)$$

Therefore, the formula (5.5) is obtained.

[Expression 81]

$$(\hat{T} + \hat{T}^2)|0000\rangle = 4|0000\rangle + |1000\rangle + |01000\rangle + |0010\rangle + |0001\rangle + \quad (5.5)$$
$$2|1100\rangle + 2|1010\rangle + 2|1001\rangle + 2|0110\rangle + 2|0101\rangle + 2|0011\rangle$$

Therefore, the formula (5.6) is obtained.

[Expression 82]

$$\exp\{-(\hat{T} + \hat{T}^2)\Delta t\}|0000\rangle \cong |0000\rangle - \{4|0000\rangle + |1000\rangle + |0100\rangle + \quad (5.6)$$
$$|0010\rangle + |0001\rangle + 2|1100\rangle + 2|1010\rangle +$$
$$2|1001\rangle + 2|0110\rangle + 2|0101\rangle + 2|0011\rangle\}\Delta t + O(\Delta t^2)$$

As can be seen from this, by introducing a higher-order magnetic field, a term that is equal to or more than two-particle excitation can be included in the term of $\Delta t$. Therefore, a transition probability when the nonlinear magnetic field is added is given as the formula (5.7) if the nonlinear magnetic field is perturbative.

[Expression 83]

$$P_{i \to j} = \frac{2\pi}{\hbar} \left| \langle n_1 | \hat{T}^2 | n_2 \rangle \right|^2 \rho \tag{5.7}$$

Here, $\rho$ is a state density of the end state. This is referred to as Fermi's golden rule. For example, by adding the nonlinear magnetic field from outside, adiabatic channels related to two or more spins are coupled. If coupling occurs, degeneracy is resolved according to a coupling strength. Therefore, a channel coupled to the ground state is not observed. The same is applied to the excited state. In a case where coupling between the excited states occurs, a mode with the lowest energy among the coupled channels is observed.

Figure 22:
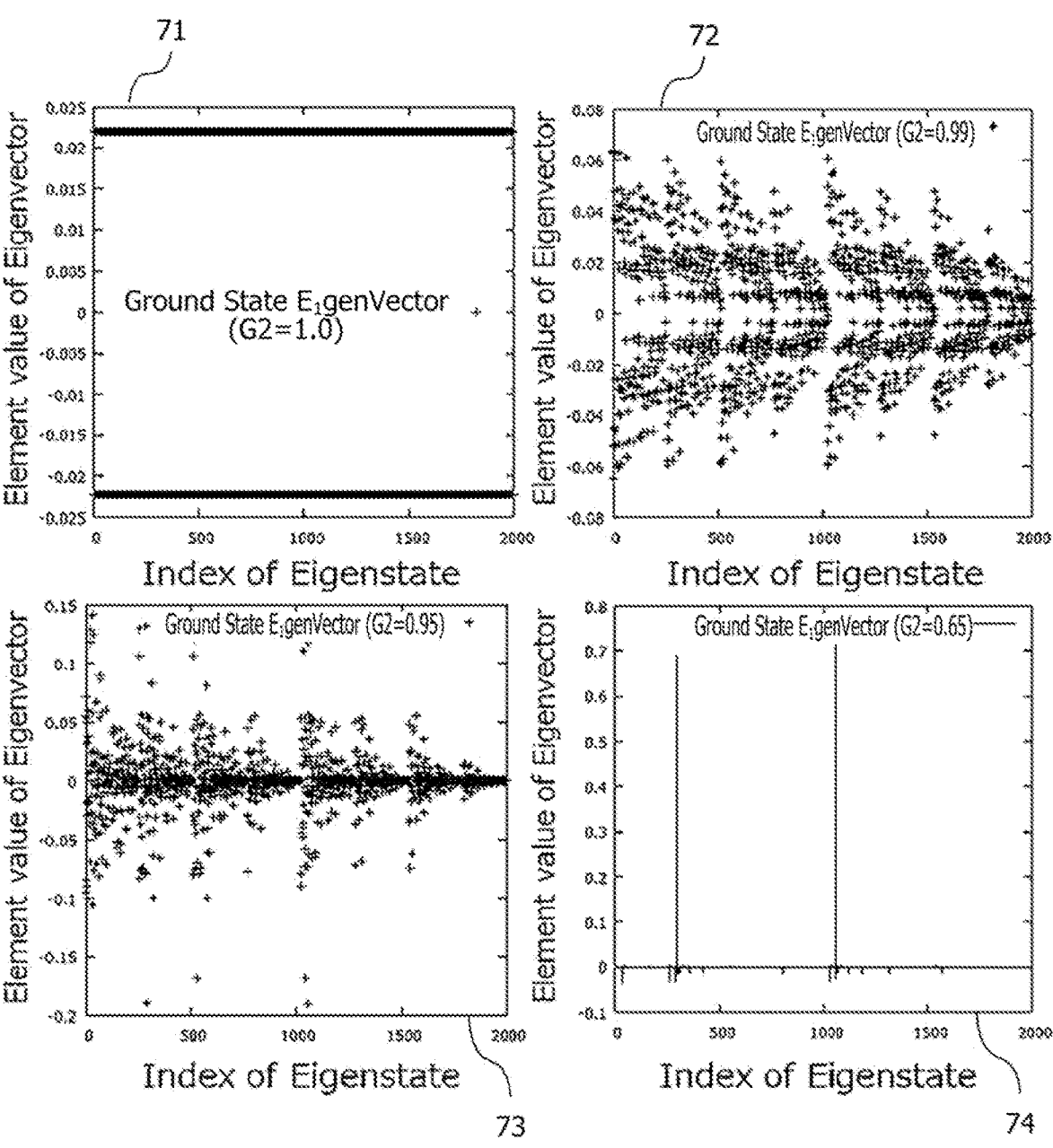
FIG. 22 is a diagram illustrating an example of an eigenvector when a Hamiltonian of the 4-city TSP is numerically diagonalized.

FIG. 22 is a diagram illustrating an example of an eigenvector when the Hamiltonian of the 4-city TSP is numerically diagonalized. In graphs 71 to 74 illustrated in FIG. 22, the horizontal axis indicates an index for distinguishing each eigenstate, and the vertical axis indicates an element value of an eigenvector corresponding to each eigenstate. The graph 71 illustrates a case of $G_2=1.0$. Since the graph 71 illustrates the ground state of the transverse magnetic field term, all states are included with equal weights. The graph 72 illustrates a case of $G_2=0.99$. Since information regarding a longitudinal magnetic field term (Hamiltonian to be solved) is included, a weight is added to the basis here. Then, as the value of $G_2$ decreases, an amplitude of a specific basis is amplified (graphs 73 and 74).

As illustrated in the graph 74, only two quantum states finally remain in this case. However, both of these quantum states are the states with E=7.414. The reason why it seems that only two ground states are obtained is because only first 2048 dimensions are extracted.

FIG. 23 is a diagram illustrating an example of a correspondence relationship between an index of an eigenvector and an eigenstate. A correspondence table 81 illustrated in FIG. 23 is a table obtained by extracting some indices of which amplitudes of eigenvectors are large in the graph 74 in FIG. 22 and collecting spin states and energy eigenvalues corresponding to the indices. It is obvious from seeing a spin state that, although a spin of which the Hamming Distance is one has a finite amplitude, a spin having two or more Hamming Distances has an amplitude of the eigenvector that is rapidly decreased. For example, this is because the transverse magnetic field is set to be the first order. A mode having two or more Hamming Distances for the ground state is substantially ignored.

This fact implies the following. In a case where a second-order transverse magnetic field is included, a mode to be coupled to (can be transitioned to) a certain quantum state |i> is a mode of which the Hamming Distance is only equal to or less than two, for example, a mode in which two spins are reversed. Typically, since the Hamming Distance of the spin state in the ground state is largely different from that in the first excited state, when the second-order transverse magnetic field is included, the modes of which the Hamming Distances are equal to or less than two are coupled from the respective states. Then, a sort of grouping occurs. As a result, the number of observed quantum states is reduced due to grouping.

Although the energy difference between the adiabatic potentials of the plurality of a plurality of orders increases by introducing the nonlinear magnetic field, the energy difference between the channels that does not affect each other is not affected by the nonlinear transverse magnetic field term.

Still, the effect is partially received. Therefore, the number of the quantum states that are finally observed is reduced. However, since a second-order nonlinear transverse magnetic field describes only elementary steps related to two spins, not all the channels are necessarily related to coupling. Therefore, it is not possible to make a state where only the ground state is observed.

Then, this fact implies the following fact. Typically, an order of the transverse magnetic field used to couple all the states is N. It is required to add all the orders of the transverse magnetic field from a first-order term to an Nth-order term. Alternatively, as exp ($-\beta T$) (T is with ^), a nonlinear transverse magnetic field of which series expansion can be defined up to the Nth-order should be added.

However, since the degeneracy is partially resolved even if the second-order transverse magnetic field is used, the probability of obtaining the ground state is improved. Therefore, even if a very simple nonlinear magnetic field is used, an efficiency of the quantum annealing is improved.

Furthermore, in a case where the second-order transverse magnetic field is used, there may be a case where the probability of obtaining the ground state is dramatically improved in a Hamiltonian system having a specific structure. This depends on the structure of the Hamiltonian. However, if the modes coupled in the second-order nonlinear transverse magnetic field significantly increase, an efficiency is also enhanced.

Although complicated explanation has been made above, the essence of the phenomenon is simple. That is the "Zeeman effect" written in elementary textbooks of the quantum mechanics. In one Hamiltonian system, an eigenvalue has been degenerated. By adding the magnetic field and introducing a non-diagonal term of a Hamiltonian matrix, the degeneracy is resolved. The degeneracy can be solved only for pairs of which the non-diagonal terms of the Hamiltonian matrix are not zero due to the nonlinear external magnetic field. Therefore, there are groups that do not affect each other. Channels that affect each other, for example, channels to be coupled are grouped. As a result, the number of states observed as the end states is reduced. As a result, the probability of obtaining the ground state relatively increases. If it is desired to completely resolve the degeneracy, it is required to reverse N spins. Therefore, a transverse magnetic field term as indicated by the formula (5.8) is used.

[Expression 84]

$$f(\hat{T}) = \sum_{i=1}^{N} c_i \hat{T}^n \tag{5.8}$$

Then, in order to satisfy boundary conditions $G_2=0$ and $G_2=1$, the Hamiltonian is set as the formula (5.9) using a function g ($G_2$) that satisfies g ($G_2$)=0 at the $G_2=0$ and $G_2=1$.

[Expression 85]

$$\hat{H}_{QA}(G_1, G_2) = G_1 \hat{H}_{TH} + G_2 \hat{T} + g(G_2) f(\hat{T}) \tag{5.9}$$

As described above, from an initial state to which noise is added, by adding the nonlinear transverse magnetic field, performing quantum annealing by combining the real number time evolution and the imaginary time evolution, and changing the quantum annealing schedule since an appropriate $G_2$, it is possible to improve efficiency of the processing without deteriorating calculation accuracy.

<Detection Whether or not Quantum Phase Transition Occurs>

A time point when the quantum phase transition occurs can be specified as $t_{qpt}$ or $G_{2,\ qpt}$ on the analysis condition setting screen 50 as illustrated in FIG. 12. However, it is possible to detect whether or not the quantum phase transition occurs in an annealing process and change the annealing schedule after the quantum phase transition has occurred. For example, if the SA is performed by the classical computer 100, energy in the annealing process can be calculated. Therefore, the occurrence of the quantum phase transition can be detected based on an energy transition in a process of the imaginary time evolution.

Figure 24:
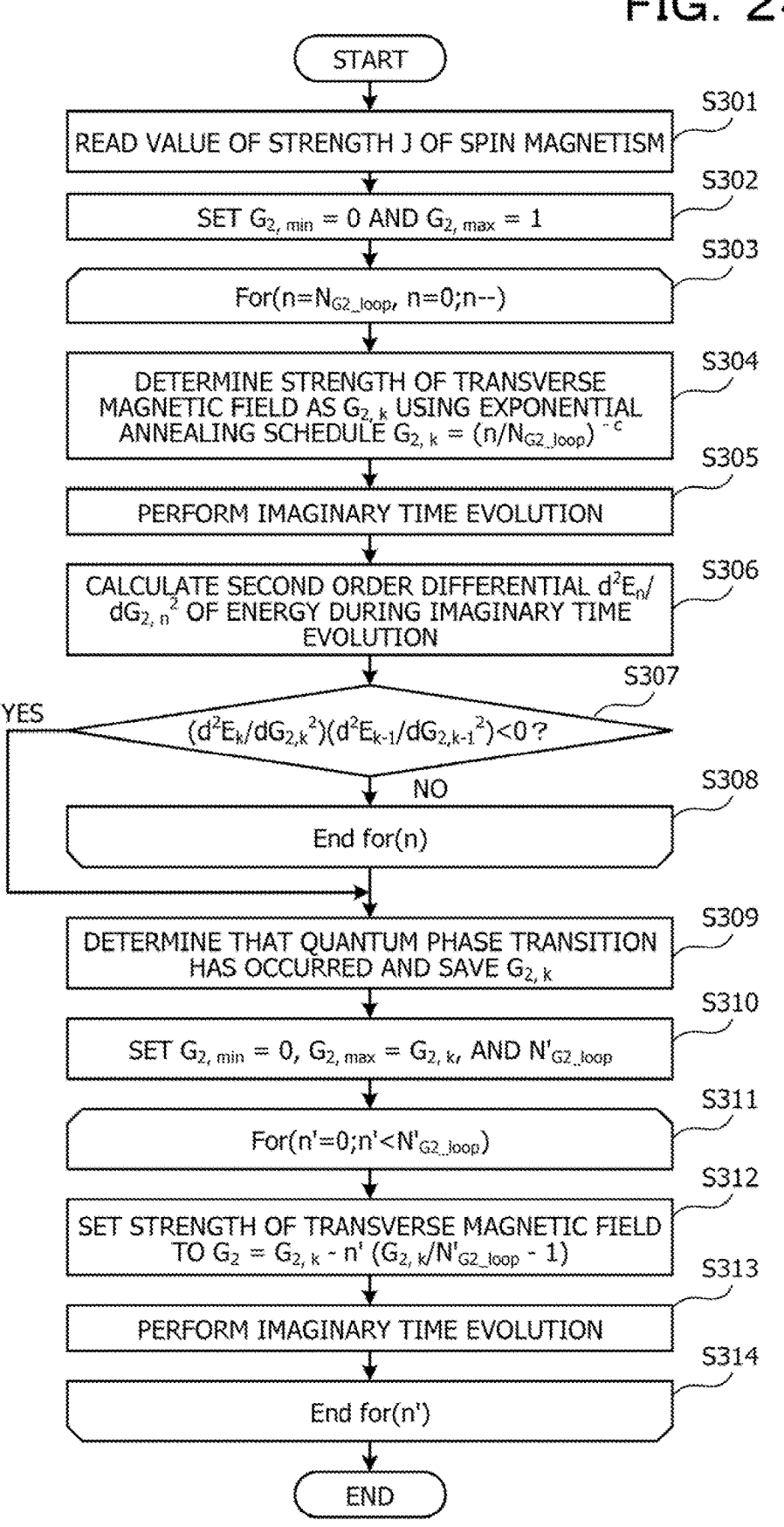
FIG. 24 is a flowchart illustrating an example of a procedure of annealing processing involving detection of a quantum phase transition.

FIG. 24 is a flowchart illustrating an example of a procedure of annealing processing involving detection of a quantum phase transition. Hereinafter, the processing illustrated in FIG. 24 is described in accordance with step numbers.

[Step S301] The processing unit 120 reads the value of the strength J of the spin magnetism.

[Step S302] The processing unit 120 sets $G_{2,\ min}$=0 and $G_{2,\ max}$=1.

[Step S303] The processing unit 120 repeats processing in steps S304 to S307 from $N_{G2\_loop}$ to zero, while decrementing the value of the variable n indicating the number of loops by one.

[Step S304] The processing unit 120 determines the strength of the transverse magnetic field as $G_{2,\ k}$ using an exponential annealing schedule "$G_{2,\ k}=(n/N_{G2\_loop})^{-c}$".

[Step S305] The processing unit 120 executes processing of the imaginary time evolution.

[Step S306] The processing unit 120 calculates a second order differential "$d^2E_n/dG_{2,\ n}^2$" of energy during the imaginary time evolution.

[Step S307] The processing unit 120 determines whether or not a condition of "$(d^2E_k/dG_{2,\ k}^2)(d^2E_{k-1}/dG_{2,k-1}^2)<0$" is satisfied. In a case where the condition is satisfied, the processing unit 120 proceeds the processing to step S309. Furthermore, in a case where the condition is not satisfied, the processing unit 120 proceeds the processing to step S308.

[Step S308] In a case where the value of the variable n reaches zero, the processing unit 120 proceeds the processing to step S309.

[Step S309] The processing unit 120 determines that the quantum phase transition has occurred and saves a value of $G_{2,\ k}$ at this time.

[Step S310] The processing unit 120 sets $G_{2,\ min}$=0, $G_{2,\ max}$=$G_{2,\ k}$, and $N'_{G2\_loop}$. $N'_{G2\_loop}$ is assumed to be, for example, a value smaller than current n ($N'_{G2\_loop}$<n).

[Step S311] The processing unit 120 repeats processing in steps S312 and S313 from zero to $N'_{G2\_loop}$ while incrementing a value of a variable n' indicating the number of loops by one.

[Step S312] The processing unit 120 sets the strength of the transverse magnetic field to "$G_2=G_{2,\ k}$−n' $(G_{2,\ k}/N'_{G2\_loop}-1)$".

[Step S313] The processing unit 120 executes the processing of the imaginary time evolution.

[Step S314] In a case where the value of the variable n' reaches $N'_{G2\_loop}$, the processing unit 120 ends the processing.

In this way, it is possible to detect the occurrence of the quantum phase transition in the imaginary time evolution and change the annealing schedule. After the change of the annealing schedule, the end state of the Ising model can be obtained with the number of samplings less than remaining number of samplings that has been scheduled before the change. This makes it possible to improve processing efficiency.

While the embodiments have been exemplified as described above, the configuration of each unit described in the embodiments may be replaced with another configuration having a similar function. Furthermore, any other components and steps may be added. Moreover, any two or more configurations (features) of the embodiments described above may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a solution search program that causes at least one computer to execute a process, the process comprising:

searching for a ground state of an Ising model that represents a problem by obtaining a state change of the Ising model;

reducing, from an initial state of the Ising model, a strength of a magnetic field applied to the Ising model according to a first annealing schedule; and reducing, after a quantum phase transition occurs in the Ising model, the strength of the magnetic field according to a second annealing schedule, wherein the second annealing schedule has fewer updates of the magnetic field up to a minimum value of the magnetic field than a first number, the first number being a number of updates of the magnetic field in a case where the strength of the magnetic field is reduced according to the first annealing schedule even after the quantum phase transition occurs in the Ising model.

2. The non-transitory computer-readable storage medium according to claim 1, the process further comprising:

searching for a ground state of the Ising model for each of a plurality of solution conditions with different values of a parameter in the Ising model; and determining a value of the parameter, based on the ground state obtained by the searching, with which the strength of the magnetic field when the quantum phase transition occurs is within a certain range.

3. The non-transitory computer-readable storage medium according to claim 2, wherein the determining the value of the parameter includes determining the value based on a frequency at which a spin arrangement in a lowest energy state is obtained for each of a plurality of solution conditions with different values of the parameter.

4. The non-transitory computer-readable storage medium according to claim 1, wherein the process further comprising determining whether the quantum phase transition occurs based on a change in energy in each state in a process of obtaining a state change of the Ising model when the magnetic field is reduced.

5. The non-transitory computer-readable storage medium according to claim 1, wherein a Hamiltonian of the Ising model includes a term that indicates a nonlinear external magnetic field of a certain order.

6. The non-transitory computer-readable storage medium according to claim 1, wherein the searching for the ground state of the Ising model includes:

reducing the strength of the magnetic field with a real number time evolution; and reducing energy of the Ising model based on an imaginary time propagation each time when the strength of the magnetic field is updated in the reducing the strength of the magnetic field with a real number time evolution.

7. The non-transitory computer-readable storage medium according to claim 6, wherein when reducing the strength of the magnetic field with a real number time evolution after the reducing energy of the Ising model based on the imaginary time propagation, determining that an end state of the reducing energy of the Ising model is an initial state of the reducing the strength of the magnetic field; and changing the strength of the magnetic field within a range where an energy difference between the end state and the initial state is smaller than a certain threshold.

8. A solution search method implemented by a computer, the solution search method comprising:

searching for a ground state of an Ising model that represents a problem by obtaining a state change of the Ising model;

reducing, from an initial state of the Ising model, a strength of a magnetic field applied to the Ising model according to a first annealing schedule; and reducing, after a quantum phase transition occurs in the Ising model, the strength of the magnetic field according to a second annealing schedule, wherein the second annealing schedule has fewer updates of the magnetic field up to a minimum value of the magnetic field than a first number, the first number being a number of updates of the magnetic field in a case where the strength of the magnetic field is reduced according to the first annealing schedule even after the quantum phase transition occurs in the Ising model.

9. The solution search method according to claim 8, further comprising:

searching for a ground state of the Ising model for each of a plurality of solution conditions with different values of a parameter in the Ising model; and determining a value of the parameter, based on the ground state obtained by the searching, with which the strength of the magnetic field when the quantum phase transition occurs is within a certain range.

10. The solution search method according to claim 9, wherein the determining the value of the parameter includes determining the value of based on a frequency at which a spin arrangement in a lowest energy state is obtained for each of a plurality of solution conditions with different values of the parameter.

11. The solution search method according to claim 8, further comprising determining whether the quantum phase transition occurs based on a change in energy in each state in a process of obtaining a state change of the Ising model when the magnetic field is reduced.

12. The solution search method according to claim 8, wherein a Hamiltonian of the Ising model includes a term that indicates a nonlinear external magnetic field of a certain order.

13. The solution search method according to claim 8, wherein the searching for the ground state of the Ising model includes:

reducing the strength of the magnetic field with a real number time evolution; and reducing energy of the Ising model based on an imaginary time propagation each time when the strength of the magnetic field is updated in the reducing the strength of the magnetic field with a real number time evolution.

14. The solution search method according to claim 13, wherein when reducing the strength of the magnetic field with a real number time evolution after the reducing energy of the Ising model based on the imaginary time propagation, determining that an end state of the reducing energy of the Ising model is an initial state of the reducing the strength of the magnetic field; and changing the strength of the magnetic field within a range where an energy difference between the end state and the initial state is smaller than a certain threshold.

15. An information processing device comprising:

one or more memories; and one or more processors coupled to the one or more memories and the one or more processors configured to:

search for a ground state of an Ising model that represents a problem by obtaining a state change of the Ising model;

reduce, from an initial state of the Ising model, a strength of a magnetic field applied to the Ising model according to a first annealing schedule, and reduce, after a quantum phase transition occurs in the Ising model, the strength of the magnetic field according to a second annealing schedule, wherein the second annealing schedule has fewer updates of the magnetic field up to a minimum value of the magnetic field than a first number, the first number being a number of updates of the magnetic field in a case where the strength of the magnetic field is reduced according to the first annealing schedule even after the quantum phase transition occurs in the Ising model.

* * * * *